US011012904B2

(12) United States Patent
Purkayastha et al.

(10) Patent No.: US 11,012,904 B2
(45) Date of Patent: May 18, 2021

(54) CONDITIONAL HANDOVER (CHO) DECONFIGURATION AND FAILURE HANDLING IN WIRELESS COMMUNICATIONS

(71) Applicant: QUALCOMM Incorporated, San Diego, CA (US)

(72) Inventors: Punyaslok Purkayastha, San Diego, CA (US); Karthika Paladugu, San Diego, CA (US); Ozcan Ozturk, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,347

(22) Filed: Feb. 28, 2020

(65) Prior Publication Data

US 2020/0351734 A1 Nov. 5, 2020

Related U.S. Application Data

(60) Provisional application No. 62/842,330, filed on May 2, 2019.

(51) Int. Cl.
*H04W 36/00* (2009.01)
*H04W 36/30* (2009.01)
*H04W 74/08* (2009.01)

(52) U.S. Cl.
CPC . *H04W 36/00837* (2018.08); *H04W 36/0094* (2013.01); *H04W 36/30* (2013.01); *H04W 74/0833* (2013.01)

(58) Field of Classification Search
None
See application file for complete search history.

(56) References Cited

U.S. PATENT DOCUMENTS

| 2018/0098260 A1* | 4/2018 | Wang | H04W 36/04 |
| 2019/0223073 A1* | 7/2019 | Chen | H04W 36/0058 |
| 2020/0154326 A1* | 5/2020 | Deenoo | H04W 36/08 |

FOREIGN PATENT DOCUMENTS

| KR | 20180118047 A | 10/2018 | |
| WO | WO-2018230997 A1 * | 12/2018 | H04W 36/0061 |

OTHER PUBLICATIONS

Ericsson: "Conditional Handover Failures in NR", 3GPP Draft, 3GPP TSG RAN WG2 #105bis, R2-1903520, Conditional Handover Failures in NR, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019 (Apr. 6, 2019), XP051700864, 5 pages, Retrieved from the Internet: URL: http://www.3gpp.org/ftp/Meetings%5F3GPP%5FSYNC/RAN2/Docs/R2%2D1903520%2Ezip. [retrieved on Apr. 6, 2019] pp. 3-4.

(Continued)

*Primary Examiner* — Anh Ngoc M Nguyen
(74) *Attorney, Agent, or Firm* — Holland & Hart LLP/Qualcomm

(57) ABSTRACT

Methods, systems, and devices for wireless communications are described for management of conditional handover (CHO) configurations. A source base station may configure a user equipment (UE) with one or more CHO configurations for multiple target base stations. The CHO configurations may provide, for each target base station, one or more associated conditions that may trigger the UE to initiate a handover to the particular target base station, or to deconfigure a CHO configuration, such as based on a measurement threshold of one or more target base station measurements, one or more source base station measurements, or combinations thereof. The CHO configurations may also include failure handling information for initiating one or more (Continued)

subsequent handovers responsive to a failure of an initial handover attempt.

29 Claims, 22 Drawing Sheets

(56) References Cited

OTHER PUBLICATIONS

Nokia, et al., "Explicit Deconfiguration of CHO Command", 3GPP Draft, 3GPP TSG-RAN WG2 Meeting #105bis, R2-1904280, Explicit Deconfiguration of CHO Command, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019 (Apr. 6, 2019), XP051701587, 3 pages, Retrieved from the Internet: URL: http://www.3gpp.org/ftp/Meetings%5F3GPP%5FSYNC/RAN2/Docs/R2%2D1904280%2Ezip. [retrieved on Apr. 6, 2019] paragraph [0003].
Partial International Search Report—PCT/US2020/020621—ISA/EPO—dated May 25, 2020.
International Search Report and Written Opinion—PCT/US2020/020621—ISA/EPO—dated Sep. 22, 2020.

* cited by examiner

CONDITIONAL HANDOVER (CHO) DECONFIGURATION AND FAILURE HANDLING IN WIRELESS COMMUNICATIONS

CROSS REFERENCE

The present Application for Patent claims the benefit of U.S. Provisional Patent Application No. 62/842,330 by PURKAYASTHA et al., entitled "CONDITIONAL HANDOVER (CHO) DECONFIGURATION AND FAILURE HANDLING IN WIRELESS COMMUNICATIONS," filed May 2, 2019, assigned to the assignee hereof, and expressly incorporated by reference herein.

BACKGROUND

The following relates generally to wireless communications, and more specifically to conditional handover (CHO) deconfiguration and failure handling in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may be moving relative to one or more base stations which may result in the UE undergoing a handover procedure from a base station that the UE is currently connected with (e.g., a source base station) to a new base station (e.g., target base station). The handover procedure may be initiated by the source base station and target base station exchanging information associated with the UE, and the source base station sending a handover command to the UE. In some cases, the UE may drop the connection with the source base station and initiate a random access procedure with the target base station to establish a connection with the target base station. In some cases, a one or more handover configurations may be provided to a UE prior to the UE initiating a handover, and the UE may initiate the handover upon detecting a condition that is indicated in the configuration, which may be referred to as conditional handover (CHO). However, conditional handover configurations present challenges related to management of CHO configurations for target base stations.

SUMMARY

The described techniques relate to improved methods, systems, devices, and apparatuses that support conditional handover (CHO) deconfiguration and failure handling in wireless communications. Various aspects of the present disclosure describe techniques that provide for management of CHO configurations. In some cases, a source base station may configure a user equipment (UE) with one or more CHO configurations for multiple target base stations. The CHO configurations may provide, for each target base station, one or more associated conditions that may trigger the UE to initiate a handover to the particular target base station (e.g., based on a measurement threshold of one or more target base station measurements, one or more source base station measurements, or combinations thereof). In some cases, the CHO configurations may include failure handling information, deconfiguration criteria, or combinations thereof.

In some cases, the failure handling information may include one or more CHO timer values, and upon transmitting a random access request to a target base station, a UE may initiate a CHO timer associated with the target base station. In the event that the UE and target base station are unable to complete the random access procedure prior to an expiration of the CHO timer, the UE may identify that the handover to the target base station has failed. In some cases, responsive to the failure identification, the UE may determine whether any other target base stations have a CHO configuration, and may transmit a random access request to a second target base station in the event that a CHO configuration is present for the second base station. The UE may repeat the handover attempt and failure identification until the handover is successful or until no additional target base stations with CHO configurations are present, at which point the UE may declare a radio link failure and initiate a connection re-establishment procedure.

In some cases, the one or more CHO configurations may include deconfiguration criteria. In such cases, a UE may perform one or more measurements (e.g., signal strength or channel quality measurements) for the source base station, one or more target base stations, or combinations thereof. In cases where one or more of the measurements of a particular target base station meet deconfiguration criteria, the UE may deconfigure the CHO configuration associated with that particular target base station. In some cases, the UE may transmit a measurement report to the source base station that may include the measurement associated with the deconfigured target base station that the source base station may use to release the handover configuration. In some cases, the UE may transmit a deconfiguration indication with the measurement report (e.g., a cell ID of the target base station that is deconfigured).

A method of wireless communication at a UE is described. The method may include receiving, from a source base station, a conditional handover configuration that indicates one or more target base stations, one or more measurement thresholds for initiating a handover from the source base station to the one or more target base stations, and one or more timers associated with the handover to the one or more target base stations, determining, based on the conditional handover configuration, that a first measurement threshold for initiating the handover to a first target base station is satisfied, transmitting, based on the conditional handover configuration, a first random access request to the first target base station to initiate a first random access procedure for the handover to the first target base station, starting a first conditional handover timer for completing the first random access procedure responsive to the transmitting the first random access request, and determining a first conditional handover failure responsive to the first conditional handover timer expiring prior to completing the first random access procedure.

An apparatus for wireless communication at a UE is described. The apparatus may include a processor, memory in electronic communication with the processor, and instructions stored in the memory. The instructions may be executable by the processor to cause the apparatus to receive, from a source base station, a conditional handover configuration that indicates one or more target base stations, one or more measurement thresholds for initiating a handover from the source base station to the one or more target base stations, and one or more timers associated with the handover to the one or more target base stations, determine, based on the conditional handover configuration, that a first measurement threshold for initiating the handover to a first target base station is satisfied, transmit, based on the conditional handover configuration, a first random access request to the first target base station to initiate a first random access procedure for the handover to the first target base station, start a first conditional handover timer for completing the first random access procedure responsive to the transmitting the first random access request, and determine a first conditional handover failure responsive to the first conditional handover timer expiring prior to completing the first random access procedure.

Another apparatus for wireless communication at a UE is described. The apparatus may include means for receiving, from a source base station, a conditional handover configuration that indicates one or more target base stations, one or more measurement thresholds for initiating a handover from the source base station to the one or more target base stations, and one or more timers associated with the handover to the one or more target base stations, determining, based on the conditional handover configuration, that a first measurement threshold for initiating the handover to a first target base station is satisfied, transmitting, based on the conditional handover configuration, a first random access request to the first target base station to initiate a first random access procedure for the handover to the first target base station, starting a first conditional handover timer for completing the first random access procedure responsive to the transmitting the first random access request, and determining a first conditional handover failure responsive to the first conditional handover timer expiring prior to completing the first random access procedure.

A non-transitory computer-readable medium storing code for wireless communication at a UE is described. The code may include instructions executable by a processor to receive, from a source base station, a conditional handover configuration that indicates one or more target base stations, one or more measurement thresholds for initiating a handover from the source base station to the one or more target base stations, and one or more timers associated with the handover to the one or more target base stations, determine, based on the conditional handover configuration, that a first measurement threshold for initiating the handover to a first target base station is satisfied, transmit, based on the conditional handover configuration, a first random access request to the first target base station to initiate a first random access procedure for the handover to the first target base station, start a first conditional handover timer for completing the first random access procedure responsive to the transmitting the first random access request, and determine a first conditional handover failure responsive to the first conditional handover timer expiring prior to completing the first random access procedure.

In some examples of the method, apparatuses, and non-transitory computer-readable medium described herein, the one or more timers include at least the first conditional handover timer for completing the first random access procedure with the first target base station. In some examples of the method, apparatuses, and non-transitory computer-readable medium described herein, the conditional handover configuration includes at least a first conditional handover configuration for the first target base station and a second conditional handover configuration for a second target base station.

Some examples of the method, apparatuses, and non-transitory computer-readable medium described herein may further include operations, features, means, or instructions for determining, responsive to the first conditional handover timer expiring, that a second measurement threshold for initiating a handover to a second target base station is satisfied, transmitting, based on the conditional handover configuration, a second random access request to the second target base station to initiate a second random access procedure for the handover to the second target base station, starting a second conditional handover timer for completing the second random access procedure, and repeating the determining, transmitting, and starting for any other target base stations configured for conditional handover upon further conditional handover failures. Some examples of the method, apparatuses, and non-transitory computer-readable medium described herein may further include operations, features, means, or instructions for initiating a connection re-establishment procedure upon determining that no other target base stations are configured for conditional handover.

In some examples of the method, apparatuses, and non-transitory computer-readable medium described herein, a first duration of the first conditional handover timer may be different than a second duration of the second conditional handover timer. Some examples of the method, apparatuses, and non-transitory computer-readable medium described herein may further include operations, features, means, or instructions for selecting, responsive to the first conditional handover timer expiring, the second target base station from a set of available target base stations based on one or more of a channel quality measurement associated with each of the set of available target base stations, or any combinations thereof.

Some examples of the method, apparatuses, and non-transitory computer-readable medium described herein may further include operations, features, means, or instructions for receiving, from the source base station, a deconfiguration message that deconfigures one or more conditional handover configurations, and deconfiguring the one or more conditional handover configurations based at least in part on the deconfiguration message. In some examples of the method, apparatuses, and non-transitory computer-readable medium described herein, the deconfiguration message is received in radio resource control signaling from the source base station. Some examples of the method, apparatuses, and non-transitory computer-readable medium described herein may further include operations, features, means, or instructions for deleting one or more of a radio resource control configuration or a first measurement and reporting configuration for conditional handover trigger provided in a first conditional handover configuration, and discontinuing conditional handover measurements associated with the conditional handover configuration and evaluation of whether the measurements meet conditional handover criteria.

A method of wireless communication at a UE is described. The method may include receiving, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station, determining, based on the conditional handover configuration, that a first deconfiguration measurement threshold for deconfiguring a first conditional handover configuration of a first target base station is satisfied, and releasing the first conditional handover configuration of the first target base station.

An apparatus for wireless communication at a UE is described. The apparatus may include a processor, memory in electronic communication with the processor, and instructions stored in the memory. The instructions may be executable by the processor to cause the apparatus to receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station, determine, based on the conditional handover configuration, that a first deconfiguration measurement threshold for deconfiguring a first conditional handover configuration of a first target base station is satisfied, and release the first conditional handover configuration of the first target base station.

Another apparatus for wireless communication at a UE is described. The apparatus may include means for receiving, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station, determining, based on the conditional handover configuration, that a first deconfiguration measurement threshold for deconfiguring a first conditional handover configuration of a first target base station is satisfied, and releasing the first conditional handover configuration of the first target base station.

A non-transitory computer-readable medium storing code for wireless communication at a UE is described. The code may include instructions executable by a processor to receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station, determine, based on the conditional handover configuration, that a first deconfiguration measurement threshold for deconfiguring a first conditional handover configuration of a first target base station is satisfied, and release the first conditional handover configuration of the first target base station.

Some examples of the method, apparatuses, and non-transitory computer-readable medium described herein may further include operations, features, means, or instructions for determining, based on the conditional handover configuration, that a second triggering measurement threshold for initiating a handover to a second target base station is satisfied, and transmitting, based on a second conditional handover configuration of the second target base station, a random access request to the second target base station to initiate a random access procedure for the handover to the second target base station.

In some examples of the method, apparatuses, and non-transitory computer-readable medium described herein, the releasing the first conditional handover configuration may include operations, features, means, or instructions for deleting one or more of a radio resource control configuration, a first measurement and reporting configuration for conditional handover trigger and conditional handover deconfiguration trigger, or one or more timers associated with the first target base station, that are provided in the first conditional handover configuration, and discontinuing conditional handover measurements associated with the first target base station and evaluations of whether the measurements meet conditional handover criteria or conditional handover deconfiguration criteria.

Some examples of the method, apparatuses, and non-transitory computer-readable medium described herein may further include operations, features, means, or instructions for transmitting a measurement report to the source base station that indicates the first conditional handover configuration of the first target base station are released. In some examples of the method, apparatuses, and non-transitory computer-readable medium described herein, the measurement report contains a deconfiguration indication for the first target base station.

In some examples of the method, apparatuses, and non-transitory computer-readable medium described herein, the first deconfiguration measurement threshold may be a channel quality threshold associated with the first target base station, and where the first conditional handover configuration is released responsive to a channel quality measurement of the first target base station being below the channel quality threshold. In some examples of the method, apparatuses, and non-transitory computer-readable medium described herein, the first deconfiguration measurement threshold includes a first threshold value associated with the source base station and a second threshold value associated with the first target base station, and where the first conditional handover configuration is released responsive to a first channel quality measurement of the source base station exceeding the first threshold and a second channel quality measurement of the first target base station being below the second threshold value. In some examples of the method, apparatuses, and non-transitory computer-readable medium described herein, the first deconfiguration measurement threshold may be a difference threshold, and where the first conditional handover configuration is released responsive to a difference between channel quality measurements of the source base station and the first target base station exceeding the difference threshold.

A method of wireless communication at a source base station is described. The method may include establishing, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station and transmitting, to the UE, the one or more conditional handover configurations that each indicate an associated target base station, one or more measurement thresholds for initiating the handover of the UE from the source base station to the associated target base station, and the conditional handover time period of the associated target base station.

An apparatus for wireless communication at a source base station is described. The apparatus may include a processor, memory in electronic communication with the processor, and instructions stored in the memory. The instructions may be executable by the processor to cause the apparatus to establish, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station and transmit, to the UE, the one or more conditional handover configurations that each indicate an associated target base station, one or more measurement thresholds for initiating the handover of the UE from the source base station to the associated target base station, and the conditional handover time period of the associated target base station.

Another apparatus for wireless communication at a source base station is described. The apparatus may include means for establishing, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station and transmitting, to the UE, the one or more conditional handover configurations that each indicate an associated target base station, one or more measurement thresholds for initiating the handover of the UE from the source base station to the associated target base station, and the conditional handover time period of the associated target base station.

A non-transitory computer-readable medium storing code for wireless communication at a source base station is described. The code may include instructions executable by a processor to establish, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station and transmit, to the UE, the one or more conditional handover configurations that each indicate an associated target base station, one or more measurement thresholds for initiating the handover of the UE from the source base station to the associated target base station, and the conditional handover time period of the associated target base station.

In some examples of the method, apparatuses, and non-transitory computer-readable medium described herein, each of the one or more target base stations may have a different value for the conditional handover time period. In some examples of the method, apparatuses, and non-transitory computer-readable medium described herein, the conditional handover time period may be determined based on one or more of an estimate of movement of the UE relative to each respective target base station, a traffic load of the source base station or each respective target base station, channel quality measurements for each respective target base station provided by the UE, or any combinations thereof.

A method of wireless communication at a source base station is described. The method may include establishing, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station, a conditional handover timer value for completing the conditional handover of the UE to the associated target base station, and a deconfiguration measurement threshold for deconfiguring the conditional handover configuration of the associated target base station, and transmitting, to the UE, the one or more conditional handover configurations that each indicate the associated target base station, the triggering measurement threshold for initiating the conditional handover to the associated target base station, the conditional handover timer value for completing the conditional handover of the UE to the associated target base station, and the deconfiguration measurement threshold for deconfiguring the conditional handover configuration of the associated target base station.

An apparatus for wireless communication at a source base station is described. The apparatus may include a processor, memory in electronic communication with the processor, and instructions stored in the memory. The instructions may be executable by the processor to cause the apparatus to establish, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station, a conditional handover timer value for completing the conditional handover of the UE to the associated target base station, and a deconfiguration measurement threshold for deconfiguring the conditional handover configuration of the associated target base station, and transmit, to the UE, the one or more conditional handover configurations that each indicate the associated target base station, the triggering measurement threshold for initiating the conditional handover to the associated target base station, the conditional handover timer value for completing the conditional handover of the UE to the associated target base station, and the deconfiguration measurement threshold for deconfiguring the conditional handover configuration of the associated target base station.

Another apparatus for wireless communication at a source base station is described. The apparatus may include means for establishing, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station, a conditional handover timer value for completing the conditional handover of the UE to the associated target base station, and a deconfiguration measurement threshold for deconfiguring the conditional handover configuration of the associated target base station, and transmitting, to the UE, the one or more conditional handover configurations that each indicate the associated target base station, the triggering measurement threshold for initiating the conditional handover to the associated target base station, the conditional handover timer value for completing the conditional handover of the UE to the associated target base station, and the deconfiguration measurement threshold for deconfiguring the conditional handover configuration of the associated target base station.

A non-transitory computer-readable medium storing code for wireless communication at a source base station is described. The code may include instructions executable by a processor to establish, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station, a conditional handover timer value for completing the conditional handover of the UE to the associated target base station, and a deconfiguration measurement threshold for deconfiguring the conditional handover configuration of the associated target base station, and transmit, to the UE, the one or more conditional handover configurations that each indicate the associated target base station, the triggering measurement threshold for initiating the conditional handover to the associated target base station, the conditional handover timer value for completing the conditional handover of the UE to the associated target base station, and the deconfiguration measurement threshold for deconfiguring the conditional handover configuration of the associated target base station.

Some examples of the method, apparatuses, and non-transitory computer-readable medium described herein may further include operations, features, means, or instructions for determining to deconfigure at least one a first conditional handover configuration at the UE, transmitting, responsive to the determining to deconfigure, deconfiguration information to the UE that indicates the UE is to delete one or more of a radio resource control configuration or a first measurement and reporting configuration for the first conditional handover configuration, and releasing the first conditional handover configuration of the first target base station.

Some examples of the method, apparatuses, and non-transitory computer-readable medium described herein may further include operations, features, means, or instructions for receiving, from the UE, a measurement report that indicates that a first deconfiguration measurement threshold for deconfiguring a first conditional handover configuration of a first target base station is satisfied, and releasing the first conditional handover configuration of the first target base station responsive to the measurement report. In some examples of the method, apparatuses, and non-transitory computer-readable medium described herein, the releasing the first conditional handover configuration may include operations, features, means, or instructions for deleting one or more of a radio resource control configuration, the first deconfiguration measurement threshold, a first triggering measurement threshold, or one or more timers associated with the first target base station, that are included in the first conditional handover configuration.

In some examples of the method, apparatuses, and non-transitory computer-readable medium described herein, the releasing the first conditional handover configuration further may include operations, features, means, or instructions for providing an indication to the first target base station that the first conditional handover configuration is released.

In some examples of the method, apparatuses, and non-transitory computer-readable medium described herein, the deconfiguration measurement threshold may be a channel quality threshold associated with each respective target base station, and where the conditional handover configuration of a first target base station is released responsive to a channel quality measurement of the first target base station being below the channel quality threshold of the first target base station. In some examples of the method, apparatuses, and non-transitory computer-readable medium described herein, the deconfiguration measurement threshold includes a first threshold value associated with the source base station and a second threshold value for each respective target base station, and where the conditional handover configuration of a first target base station is released responsive to a first channel quality measurement of the source base station exceeding the first threshold and a second channel quality measurement of the first target base station being below the second threshold value of the first target base station. In some examples of the method, apparatuses, and non-transitory computer-readable medium described herein, the deconfiguration measurement threshold may be a difference threshold, and where the conditional handover configuration associated with a first target base station is released responsive to a difference between channel quality measurements of the source base station and the first target base station exceeding the difference threshold.

DETAILED DESCRIPTION

Figure 1:
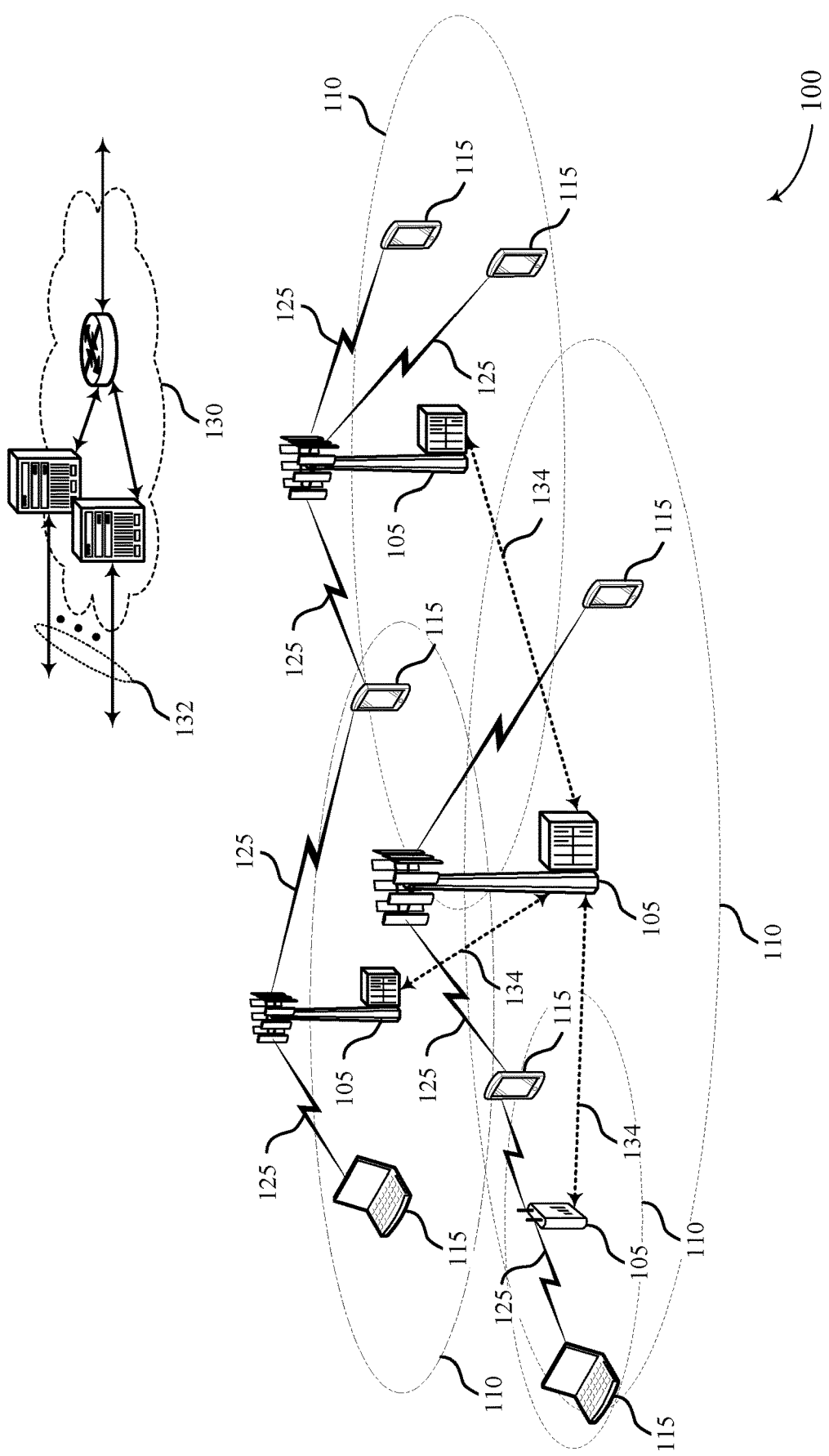
FIG. 1 illustrates an example of a system for wireless communications that supports conditional handover (CHO) deconfiguration and failure handling in wireless communications in accordance with aspects of the present disclosure.

Various aspects of the present disclosure provide techniques for user equipment (UE) handover in a wireless communications system. A UE may undergo a handover procedure from a source cell to a target cell in which the UE may release or drop an existing connection with the source cell to establish a new connection with the target cell. The handover procedure may be initiated by the source base station and target base station exchanging information associated with the UE, and the source base station sending a handover command to the UE. In some cases, the UE may drop the existing connection with the source base station upon receiving the handover command, and initiate a random access procedure with the target base station to establish a connection with the target base station. In some cases, a one or more handover configurations may be provided to a UE prior to the UE initiating a handover, and the UE may initiate the handover upon detecting a condition that is indicated in the configuration, which may be referred to as conditional handover (CHO).

In some aspects of the present disclosure, a source base station may configure a UE with one or more CHO configurations for multiple target base stations. The CHO configurations may provide, for each target base station, one or more associated conditions that may trigger the UE to initiate a handover to the particular target base station (e.g., based on a measurement threshold of one or more target base station measurements, one or more source base station measurements, or combinations thereof), and one or more associated conditions to deconfigure the CHO configuration. In some cases, the CHO configurations may include failure handling information, deconfiguration criteria, or combinations thereof.

In some cases, CHO configurations may provide one or more handover criteria for one or more target base stations. The UE may perform one or more measurements of the target base station(s), the source base station, or combinations thereof, and if the measurements meet the handover criteria the UE may initiate the handover with a target base station that met the handover criteria (e.g., by transmitting a random access request to the target base station). While CHO configurations may allow for a UE to autonomously initiate a handover in the event that handover criteria are met (e.g., if a source base station measurement is below a threshold and the target base station measurement is above a threshold), maintaining such configurations may consume resources at the base stations and UE, constrain flexibility of one or more target base stations, consume overhead associated with target base station measurements, and the like.

For example, a source base station may configure a CHO with a first target base station, which may result in the source base station periodically providing the first target base station with information associated with the UE, the first target base station reserving a contention-free random access preamble for the UE (which may constrain the first target base station from allocating contention-free preambles to other devices), the UE performing measurements on the first target base station, the UE transmitting measurement reports with the first target base station measurements, and the like. Accordingly, in the event that the first target base station is no longer a suitable candidate for handover of the UE, deconfiguring the CHO of the first target base station may be beneficial to the UE, the source base station, and the target base station. Further, if the random access procedure that is initiated as part of a CHO is unsuccessful or there is a radio link failure, service interruption or latency may be increased.

In accordance with various techniques discussed herein, in some cases one or more CHO configurations may include deconfiguration criteria. In such cases, a UE may perform one or more measurements (e.g., signal strength or channel quality measurements) for the source base station, one or more target base stations, or combinations thereof. In cases where one or more of the measurements of a first target base station meet deconfiguration criteria, the UE may deconfigure the CHO configuration associated with the first target base station. In some cases, the UE may autonomously deconfigure the CHO configuration. In some cases, the UE may transmit a measurement report to the source base station that may include the measurement associated with the deconfigured first target base station that the source base station may use to release the handover configuration. In some cases, the UE may transmit a deconfiguration indication with the measurement report (e.g., a cell ID of the target base station that is deconfigured). In other cases, the UE may maintain the CHO configuration until the source base station transmits a deconfiguration to the UE responsive to the measurement report. The source base station may also provide a cancellation indication to the first target base station, which may allow the first target base station to release resources reserved for the UE Additionally or alternatively, in some cases CHO configurations may include one or more CHO timer values, and upon transmitting a random access request to a target base station, a UE may initiate a CHO timer associated with the target base station. In the event that the UE and target base station are unable to complete the random access procedure prior to an expiration of the CHO timer, the UE may identify that the handover to the target base station has failed. In some cases, responsive to the failure identification, the UE may determine whether any other target base stations have a CHO configuration, and may transmit a random access request to a second target base station in the event that a CHO configuration is present for the second base station. The UE may repeat the handover attempt and failure identification until the handover is successful or until no additional target base stations with CHO configurations are present, at which point the UE may declare a radio link failure and initiate a connection re-establishment procedure.

Such techniques may allow for efficient management of CHO configurations and failure handling for failed CHO handovers. Deconfiguration of CHO configurations may allow for more efficient management of CHO configurations by deconfiguring CHO configurations based on measurements of a UE, which may allow for a relatively current set of CHO configurations that may be reliably used for handovers in the event that handover criteria are met. Further, failure handling techniques discussed herein may reduce latency and service interruptions associated with a failed random access procedure of a handover attempt.

Aspects of the disclosure are initially described in the context of a wireless communications system. Various exemplary process flows are then discussed that describe CHO configuration management and failure handling. Aspects of the disclosure are further illustrated by and described with reference to apparatus diagrams, system diagrams, and flowcharts that relate to CHO deconfiguration and failure handling in wireless communications.

FIG. 1 illustrates an example of a wireless communications system 100 that supports CHO deconfiguration and failure handling in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

In some cases, a base station 105 may be a source base station 105 and may configure one or more UEs 115 with one or more CHO configurations for one or more target base stations 105. The CHO configurations may provide, for each target base station 105, one or more associated conditions that may trigger the UE 115 to initiate a handover to the particular target base station 105 (e.g., based on a measurement threshold of one or more target base station 105 measurements, one or more source base station 105 measurements, or combinations thereof). In some cases, the CHO configurations may include failure handling information, deconfiguration criteria, or combinations thereof.

Figure 2:
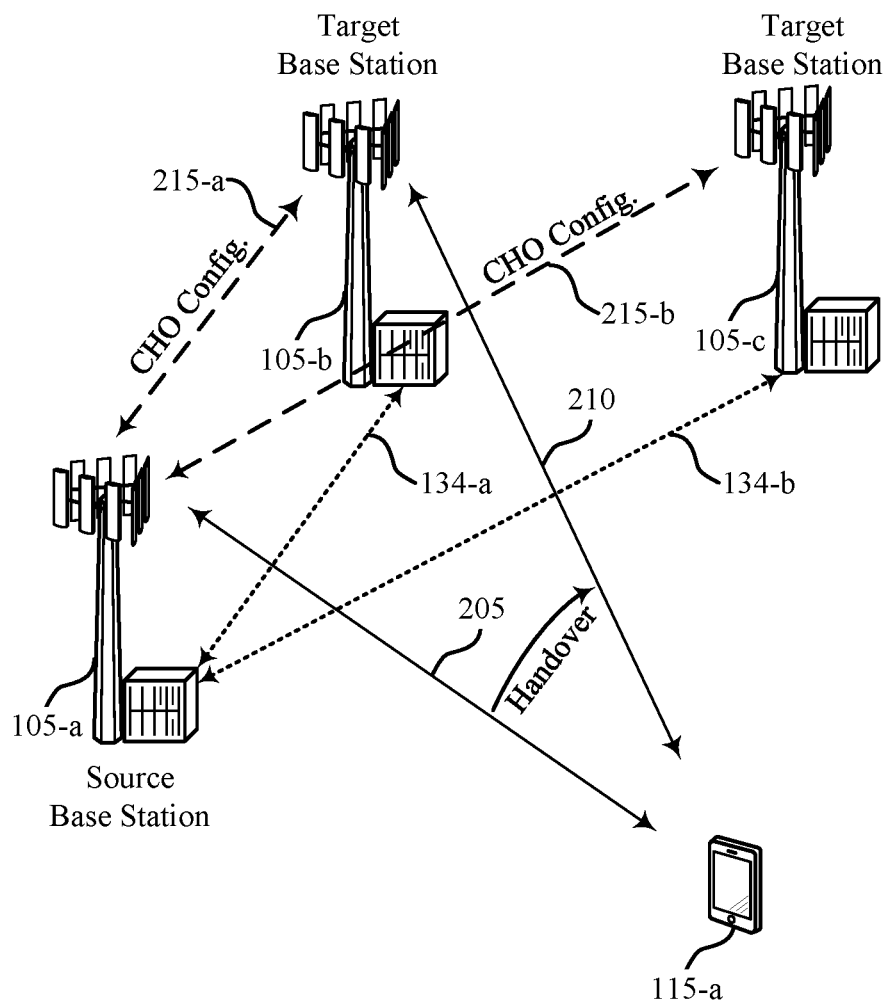
FIG. 2 illustrates an example of a portion of a wireless communications system with source and target base stations that supports CHO deconfiguration and failure handling in wireless communications in accordance with aspects of the present disclosure.

FIG. 2 illustrates an example of a wireless communications system 200 with source and target base stations that supports CHO deconfiguration and failure handling in wireless communications in accordance with aspects of the present disclosure. In some examples, wireless communications system 200 may implement aspects of wireless communications system 100. The wireless communications system 200 may include a source base station 105-a, a first target base station 105-b, and a second target base station 105-c, which may be examples of a base station 105 described with reference to FIG. 1; and a UE 115-a, which may be an example of a UE 115 described with reference to FIG. 1. The wireless communications system 200 illustrates an example of a conditional handover procedure where a communication connection between the UE 115-a and the source cell served by the source base station 105-a (e.g., first base station) is handed over to one of the first target base station 105-b or second target base station 105-c.

Initially, the UE 115-a and the source base station 105-a may be in a connected state and may be exchanging information over a first communication connection 205. In some cases, the UE 115-a may transmit one or more measurement reports in which the UE 115-a may provide one or more measurements for the source base station 105-a and a number of neighboring base stations that include the first target base station 105-b and the second target base station 105-c. Based in the measurements in the measurement report, the source base station 105-a may identify one or more neighboring base stations 105 that are good candidates for handover of the UE 115-a (e.g., based on signal strength measurements being above a threshold value). In this example, the source base station 105-a may identify the first target base station 105-b and the second target base station 105-c are handover candidates, and may communicate handover requests (e.g., via backhaul links 134) to each identified candidate. In this example, the first target base station 105-b may perform admission control based on the received handover request and reserve certain resources for the UE 115-a (e.g., a contention-free random access preamble, random access resources, etc.), and provide information for random access to the source base station 105-a, which may be used to configure a first CHO configuration 215-a. Likewise, the second target base station 105-c may perform admission control based on the received handover request and reserve certain resources for the UE 115-a, and provide information for random access to the source base station 105-a, which may be used to configure a second CHO configuration 215-b.

The source base station 105-a may provide CHO configurations to the UE 115-a, which may be used by the UE 115-a to autonomously initiate a handover to a second communication connection 210. In some cases, the CHO configurations may be provided in RRC signaling (e.g., in an RRC reconfiguration message) that is transmitted to the UE 115-a. The CHO configurations may provide, for example, a cell ID of the associated target base station 105, information for random access to the target base station 105 (e.g., contention-free random access resources, a random access preamble, a cell-specific radio network temporary identifier (C-RNTI), etc.), and one or more measurement thresholds (e.g., RRM thresholds, channel quality metric thresholds, signal strength metric thresholds, etc.) that are to be used to trigger handover to the associated target base station 105. In accordance with various techniques provided herein, the CHO configurations provided to the UE 115-a may also include one or more deconfiguration parameters, one or more failure handling parameters, or any combinations thereof.

In some cases, the deconfiguration parameters in CHO configurations may provide event-based deconfiguration and may include one or more timers, one or more deconfiguration thresholds for each CHO target base station 105-b and 105-c, or any combinations thereof. Optionally, in some cases, the one or more timers may include a validity timer that starts when the handover request is acknowledged to the source base station 105-a. In some cases, the validity timer (e.g., valTimer_TgNB) may be maintained by the source base station 105-a and the target base stations 105-b and 105-c, and each target base station 105-b and 105-c may reserve resources for the UE 115-a during the duration of the validity timer. In other cases, the UE 115-a may also receive an indication of the validity timer associated with each target base station 105-b and 105-c with the CHO configurations, and may deconfigure the associated CHO configuration upon expiration of the associated validity timer. In other cases, the source base station 105-a may transmit an explicit release of the CHO configuration for the target base station 105-b or 105-c with the expired validity timer, and in such cases the UE 115-a does not need to maintain a validity timer, or multiple validity timers for each target base station 105-b and 105-c. In some cases, the source base station 105-a may determine a duration of the validity timer, which may be based on estimates of UE 115-a movement, signal strength of the target measured at the UE 115-a, changes in measurements at the UE 115-a over time, estimates of a traffic load of source base station 105-a or target base stations 105-b or 105-c (e.g., as tracked by the respective base station 105), or any combinations thereof.

In some cases, the CHO configurations may include one or more deconfiguration thresholds that provide criteria for deconfiguring a CHO. In such cases, if UE 115-a measurements satisfy the threshold-based criteria for deconfiguration for a CHO target base station 105-b or 105-c, the UE 115-a may release the CHO configuration without waiting for an explicit indication from the source base station 105-a. The release of the CHO configuration may include releasing the RRC configuration of the target base station 105-b or 105-c, as well as associated measurement reporting configurations corresponding to handover trigger and CHO deconfiguration trigger. In some cases, the UE 115-a may transmit a measurement report to the source base station 105-a so that the network is informed of the deconfiguration and the target base station 105-b or 105-c may release reserved resources for the UE 115-a. In some cases, the measurement report (e.g., a RRC measurement report message) may include a deconfiguration indication (e.g., a cell ID of the deconfigured target base station 105-b or 105-c). Upon deconfiguring the CHO configuration for the target base station 105-b or 105-c, the UE 115-a may discontinue performing measurements on and evaluating whether the target base station 105-*b* or 105-*c* meets the handover or CHO deconfiguration criteria. In some cases, one or more measurement events may be defined for CHO deconfiguration. In some example, such measurement events may include Event 1, where a neighbor cell measurement (e.g., a signal strength, channel quality metric, etc.) drops below a threshold value; Event 2, where the source base station 105-*a* (e.g., a source primary cell (SpCell)) measurement becomes better than a first threshold value and a target base station 105-*b* or 105-*c* measurement becomes worse than a second threshold value; Event 3, where a measurement offset between a target base station 105-*b* or 105-*s* measurement and the source base station 105-*a* exceeds an offset threshold value; or any combinations thereof. Upon detection of one or more of the measurement events, the UE 115-*a* may release the associated CHO configuration, and provide a measurement report (e.g., that contains an indication of the deconfiguration) to the source base station 105-*a*. In some cases, the measurement thresholds configured in each CHO may be different for each target base station 105-*b* and 105-*c*.

In some cases, the CHO configurations may, additionally or alternatively, include one or more timers for use in detecting a failure of a handover. In some cases, the one or more timers may include a conditional handover timer (e.g., CHO_timer_TgNB) that is initiated by the UE 115-*a* upon transmission of a random access request of a handover procedure. In such cases, the UE 115-*a* may determine, for example, that CHO criteria for a handover from the source base station 105-*a* to the first target base station 105-*b* is satisfied, and may transmit the random access request to the first target base station 105-*a* and start the conditional handover timer. If the conditional handover timer expires prior to the UE 115-*a* establishing a connection with the first target base station 105-*b*, the UE 115-*a* may assume that the random access procedure has failed and initiate failure handling. In cases where the UE 115-*a* maintains a validity timer for the first target base station 105-*b*, the UE 115-*a* may stop the validity timer upon transmitting the random access request. In some cases, the failure handling may include selecting the second target base station 105-*c* (e.g., or another base station with a CHO configuration where the UE 115-*a* meets CHO criteria for initiating a handover), and transmitting a random access request to the second target base station 105-*c*. The UE 115-*c* may initiate a second conditional access timer associated with the second target base station 105-*c*, and the process may continue until a successful random access procedure is performed, or until the UE 115-*a* runs out of CHO targets that meet CHO criteria, at which point the base station 105-*b* may declare a radio link failure and initiate a RRC re-establishment procedure. In some cases, the conditional handover timer may be different for each of the different target base stations. Table 1 below includes an example of conditional handover timer start criteria, stop criteria, and failure actions to take in the event of conditional handover timer expiration.

TABLE 1

| CHO failure handling timer | | |
| --- | --- | --- |
| CHO_timer_TgNB start | CHO_timer_TgNB stop | Upon CHO_timer_TgNB expiry |
| Upon initiating random access on a CHO target cell, which meets the CHO triggering criteria. | Upon successful completion of random access procedure on the CHO target cell. | Stop ongoing random access procedure on the CHO target cell. If there are target cells for which CHO has been triggered and for which the validity timer (if configured) has not expired, UE initiates handover to these cells (one at a time). If there are no such target cells remaining, UE performs the RRC re-establishment procedure. |

Figure 3:
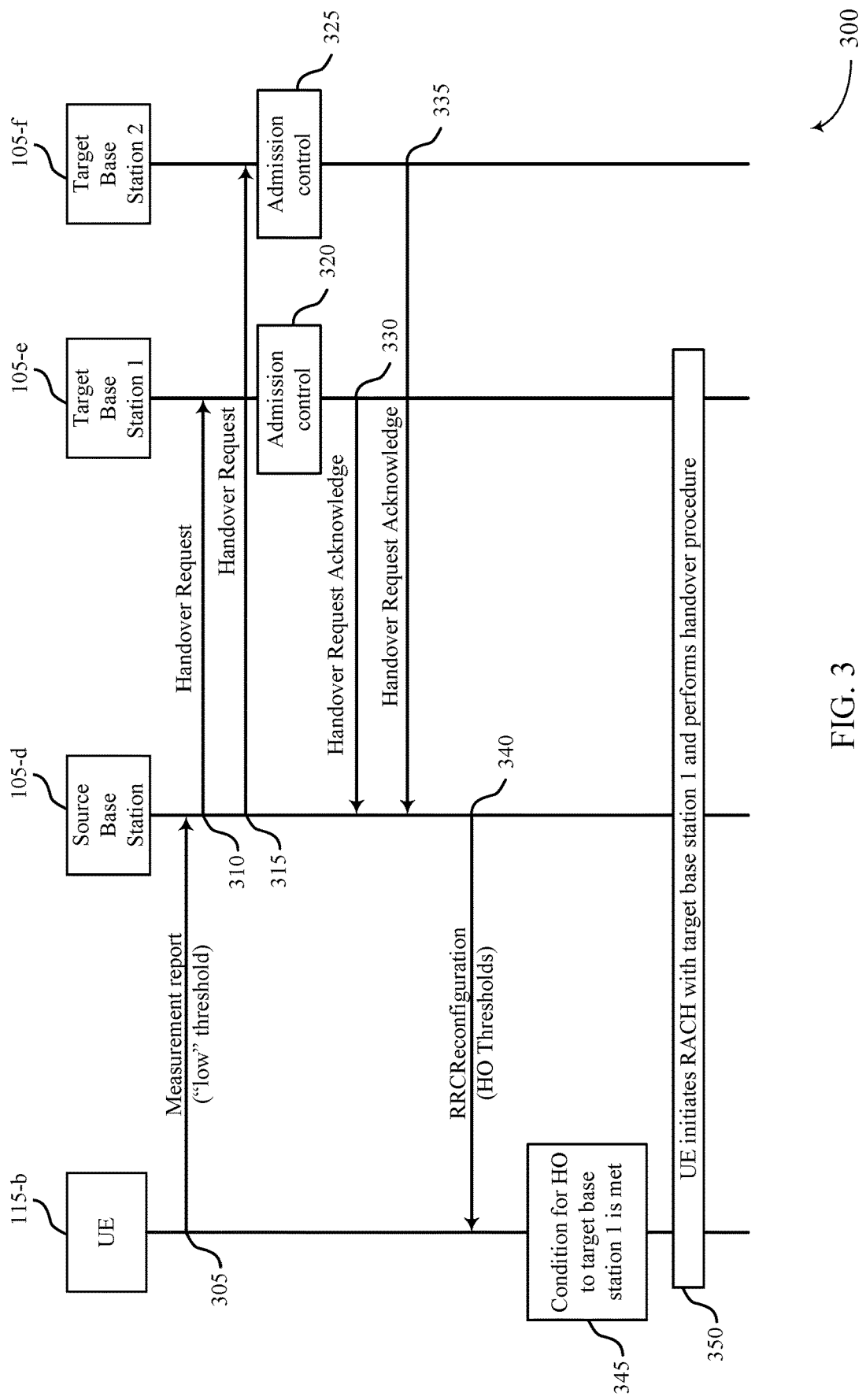
FIGS. 3 through 7 illustrate example process flows that support CHO deconfiguration and failure handling in wireless communications in accordance with aspects of the present disclosure.

FIG. 3 illustrates an example of a general process flow 300 for CHO, that supports CHO deconfiguration and failure handling in wireless communications in accordance with aspects of the present disclosure. In some examples, process flow 300 may implement aspects of wireless communications system 100 or 200. The process flow in this example includes a UE 115-*b*, which may be an example of a UE described with reference to FIGS. 1 and 2; a source base station 105-*d*, a first target base station 105-*e*, and a second target base station 105-*f*, which may be examples of base stations described with reference to FIGS. 1 and 2. The process flow 300 includes functions and communications implemented by UE 115-*b* and base stations 105-*d*, 105-*e*, and 105-*f* in the context of conditional handover procedures.

In the following description of the process flow 300, the operations between UE 115-*b* and base station 105-*d*, 105-*e*, and 105-*f* may be transmitted in a different order than the order shown, or the operations may be performed in different orders or at different times. Certain operations may also be left out of the process flow 300, or other operations may be added to the process flow 300. It is to be understood that while base stations 105 and UE 115-*b* are shown performing a number of the operations of process flow 300, any wireless device may perform the operations shown.

At 305, the UE 115-*b* may transmit a measurement report to the source base station 105-*d*. The measurement report may include one or more channel measurements for the source base station 105-*d*, as well as measurements for multiple neighboring base stations, which may include the first target base station 105-*e* and the second target base station 105-*f*. The measurement report may be a "low" threshold measurement report, which may indicate that a channel measurement associated with the source base station 105-*d* is below a threshold value that is used to indicate that the source base station 105-*d* should configure a CHO for the UE 115-*b*.

At 310, the source base station 105-*d* may transmit a handover request to the first target base station 105-*e*. Further, at 315, the source base station 105-*d* may transmit a handover request to the second target base station 105-*f*. In some cases, the source base station 105-*d* may select the first target base station 105-*e* and the second target base station 105-*f* for the handover requests based on associated measurements from the measurement report of the UE 115-*b* (e.g., based on neighboring base station measurements that are above a threshold value or that are better than other of the neighboring base station measurements). While this example shows two target base stations 105, more or fewer target base stations 105 may be identified for CHO configuration. In some cases, the handover requests may include handover information associated with the UE 115-*b*, and may also include a time duration for a validity timer as discussed herein.

At 320, the first target base station 105-*e* may perform admission control responsive to receiving the handover request. Likewise, at 325, the second target base station 105-*f* may perform admission control responsive to receiving the handover request. The admission control may determine that resources may be reserved for the UE 115-*c* (e.g., a C-RNTI, contention free random access resources, random access preamble, etc.).

At 330, the first target base station 105-*e* may transmit a handover request acknowledgment to the source base station 105-*d*. Further, in this example, at 335, the second target base station 105-*f* may transmit a handover request acknowledgment to the source base station 105-*d*. The handover request acknowledgments may include information for use by the UE 115-*b* to establish a connection (e.g., random access preamble, C-RNTI, etc.). The source base station 105-*d* may receive the handover request acknowledgments, and determine CHO criteria for each target cell for use by the UE 115-*b* to trigger a CHO. The CHO criteria may include, for example, one or more measurement thresholds of the associated target base station 105, the source base station 105-*d*, or any combinations thereof.

At 340, the source base station 105-*d* may transmit CHO configuration information to the UE 115-*b* in a RRC reconfiguration message. In some cases, the RRC reconfiguration message may indicate that the first target base station 105-*e* and the second target base station 105-*f* are configured for CHO, may provide information for accessing the associated base stations 105 (e.g., random access information, C-RNTI, etc.), and may provide handover thresholds associated with each target base station 105.

At 345, the UE 115-*b* may determine that a condition for handover to the first target base station 105-*d* is met. Such a determination may be made, for example, based on one or more channel quality measurements of the UE 115-*b* that are compared to the CHO configurations provided by the source base station 105-*d*. At 350, the UE 115-*b* may initiate a random access channel (RACH) procedure with the first target base station 105-*e* and perform the handover procedure.

Figure 4:
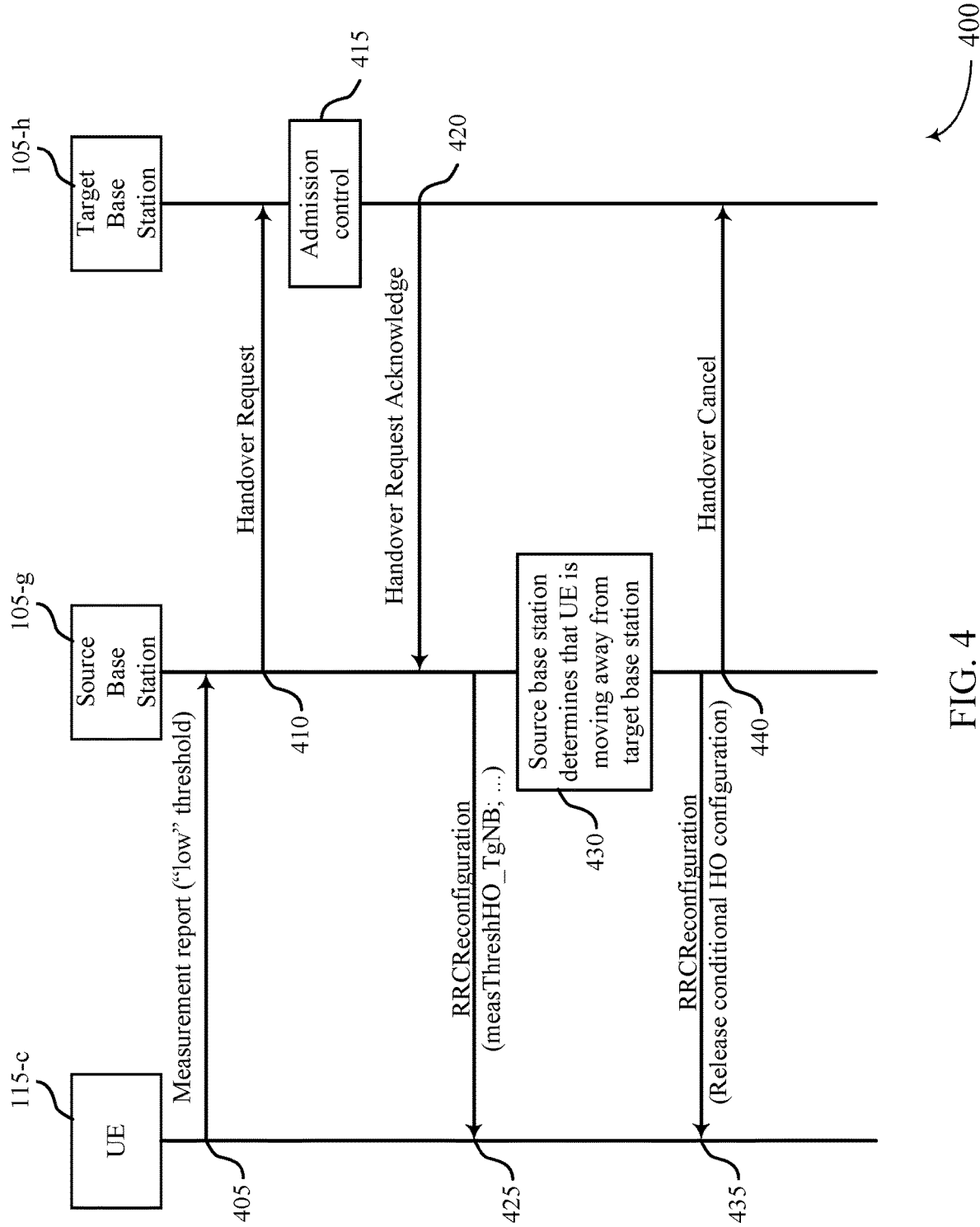

FIG. 4 illustrates an example of a process flow 400 for configuring and then releasing a CHO configuration in wireless communications in accordance with aspects of the present disclosure. In some examples, process flow 400 may implement aspects of wireless communications system 100 or 200. The process flow in this example includes a UE 115-*c*, which may be an example of a UE described with reference to FIGS. 1 and 2; a source base station 105-*g*, and a target base station 105-*h*, which may be examples of base stations described with reference to FIGS. 1 and 2. The process flow 400 includes functions and communications implemented by UE 115-*c* and base stations 105-*g*, and 105-*h* in the context of conditional handover procedures.

In the following description of the process flow 400, the operations between UE 115-*c* and base station 105-*g* and 105-*h* may be transmitted in a different order than the order shown, or the operations may be performed in different orders or at different times. Certain operations may also be left out of the process flow 400, or other operations may be added to the process flow 400. It is to be understood that while base stations 105 and UE 115-*c* are shown performing a number of the operations of process flow 400, any wireless device may perform the operations shown.

At 405, the UE 115-*c* may transmit a measurement report to the source base station 105-*g*. The measurement report may include one or more channel measurements for the source base station 105-*g*, as well as measurements for multiple neighboring base stations, which may include the target base station 105-*h*. The measurement report may be a "low" threshold measurement report, which may indicate that a channel measurement associated with the source base station 105-*g* is below a threshold value that is used to indicate that the source base station 105-*g* should configure a CHO for the UE 115-*c*.

At 410, the source base station 105-*g* may transmit a handover request to the target base station 105-*h*. While the example of FIG. 4 illustrates a single target base station 105-*h*, in other cases multiple different target base stations may be configured for CHO and the operations of FIG. 4 may be used for any number of target base stations. In some cases, the source base station 105-*g* may select the target base station 105-*h* for the handover request based on associated measurements from the measurement report of the UE 115-*c* (e.g., based on neighboring base station measurements that are above a threshold value or that are better than other of the neighboring base station measurements). In some cases, the handover request may include handover information associated with the UE 115-*c*, and may also include a time duration for a validity timer as discussed herein.

At 415, the target base station 105-*h* may perform admission control responsive to receiving the handover request. The admission control may determine that resources may be reserved for the UE 115-*c* (e.g., a C-RNTI, contention free random access resources, random access preamble, etc.).

At 420, the target base station 105-*h* may transmit a handover request acknowledgment to the source base station 105-*g*. The handover request acknowledgment may include information for use by the UE 115-*c* to establish a connection (e.g., random access preamble, C-RNTI, etc.) with the target base station 105-*h*. The source base station 105-*g* may receive the handover request acknowledgment, and determine CHO criteria for the target cell for use by the UE 115-*c* to trigger a CHO. The CHO criteria may include, for example, one or more measurement thresholds (e.g., measThreshHO_TgNB) of the target base station 105-*h* (and for any other configured target base stations), the source base station 105-*g*, or any combinations thereof.

At 425, the source base station 105-*g* may transmit CHO configuration information to the UE 115-*c* in a RRC reconfiguration message. In some cases, the RRC reconfiguration message may indicate that the target base station 105-*h* is configured for CHO, may provide information for accessing the associated base stations 105 (e.g., random access information, C-RNTI, etc.), and may provide handover thresholds associated with each the target base station 105-*h*.

At 430, the source base station may determine that the UE 115-*c* is moving away from the target base station 105-*h*. In some cases, such a determination may be made based on one or more measurement reports provided by the UE 115-*c*, based on signal strength measurements of the UE 115-*c*, positioning information of the UE 115-*c*, and the like.

At 435, the source base station 105-*g* may transmit another RRC reconfiguration to the UE 115-*c* to release the CHO configuration for the target base station 105-*h*. At 440, the source base station 105-*g* may transmit a handover cancellation to the target base station 105-*h* to cancel the CHO configuration. The UE 115-*c* and the target base station 105-*h* may delete the CHO configuration based on the signaling from the source base station 105-*g*.

Figure 5:
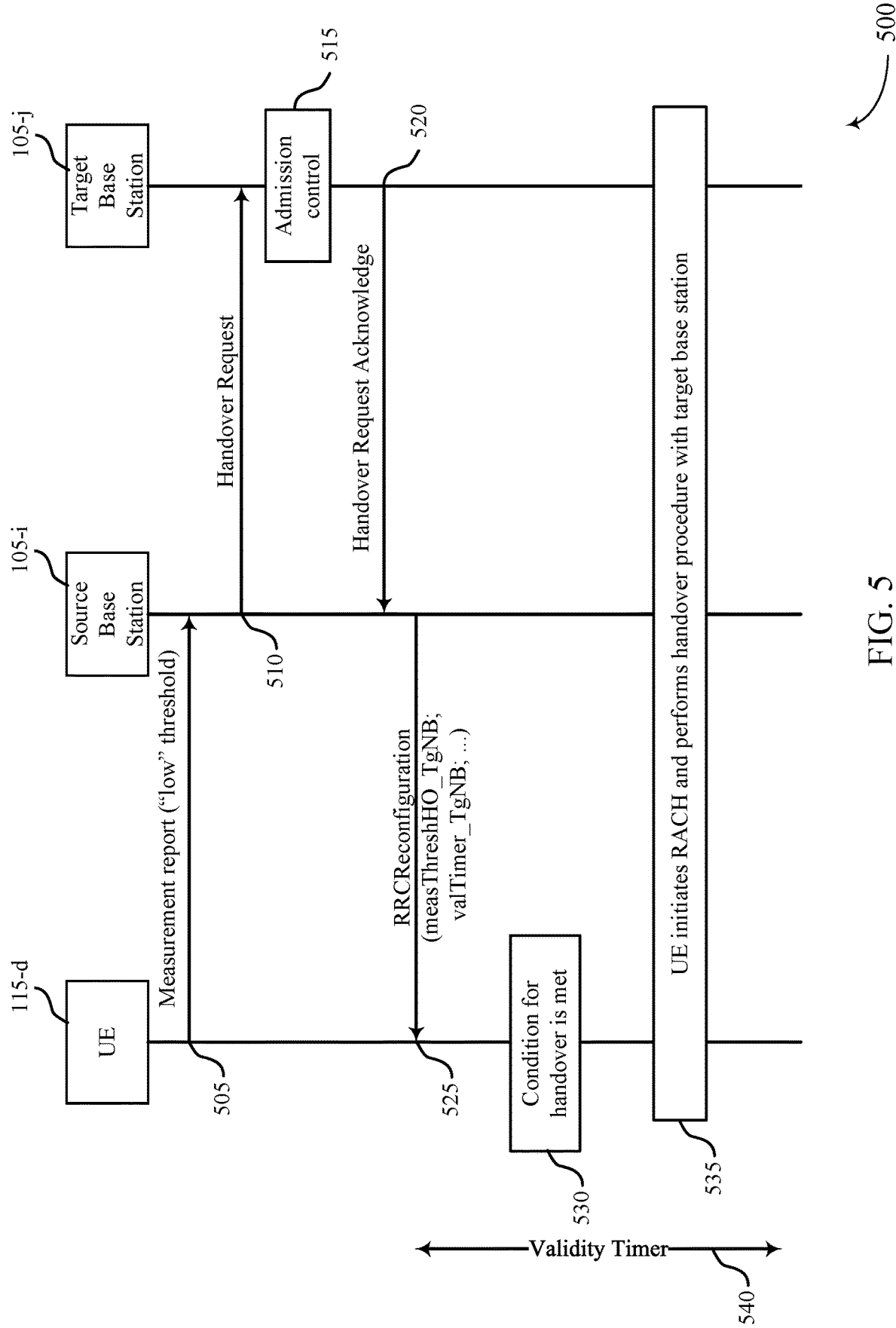

FIG. 5 illustrates an example of a process flow 500 that supports CHO deconfiguration and failure handling in wireless communications in accordance with aspects of the present disclosure. In some examples, process flow 500 may implement aspects of wireless communications system 100 or 200. The process flow in this example includes a UE 115-*d*, which may be an example of a UE described with reference to FIGS. 1 and 2; a source base station 105-*i*, and a target base station 105-*j*, which may be examples of base stations described with reference to FIGS. 1 and 2. The process flow 500 includes functions and communications implemented by UE 115-*d* and base stations 105-*i*, and 105-*j* in the context of conditional handover procedures.

In the following description of the process flow 500, the operations between UE 115-*d* and base station 105-*i* and 105-*j* may be transmitted in a different order than the order shown, or the operations may be performed in different orders or at different times. Certain operations may also be left out of the process flow 500, or other operations may be added to the process flow 500. It is to be understood that while base stations 105 and UE 115-*d* are shown performing a number of the operations of process flow 500, any wireless device may perform the operations shown.

At 505, the UE 115-*d* may transmit a measurement report to the source base station 105-*i*. The measurement report may include one or more channel measurements for the source base station 105-*i*, as well as measurements for multiple neighboring base stations, which may include the target base station 105-*j*. The measurement report may be a "low" threshold measurement report, which may indicate that a channel measurement associated with the source base station 105-*i* is below a threshold value that is used to indicate that the source base station 105-*i* should configure a CHO for the UE 115-*d*.

At 510, the source base station 105-*i* may transmit a handover request to the target base station 105-*j*. While the example of FIG. 5 illustrates a single target base station 105-*j*, in other cases multiple different target base stations may be configured for CHO and the operations of FIG. 5 may be used for any number of target base stations. In some cases, the source base station 105-*i* may select the target base station 105-*j* for the handover request based on associated measurements from the measurement report of the UE 115-*d* (e.g., based on neighboring base station measurements that are above a threshold value or that are better than other of the neighboring base station measurements). In some cases, the handover request may include handover information associated with the UE 115-*d*, and may also optionally include a time duration for a validity timer 540. In cases where multiple CHO configurations for multiple target base stations are configured, multiple different validity timers may be present for the different target base stations.

At 515, the target base station 105-*j* may perform admission control responsive to receiving the handover request. The admission control may determine that resources may be reserved for the UE 115-*d* (e.g., a C-RNTI, contention free random access resources, random access preamble, etc.).

At 520, the target base station 105-*j* may transmit a handover request acknowledgment to the source base station 105-*i*. The handover request acknowledgment may include information for use by the UE 115-*d* to establish a connection (e.g., random access preamble, C-RNTI, etc.) with the target base station 105-*j*. The source base station 105-*i* may receive the handover request acknowledgment, and determine CHO criteria for the target cell for use by the UE 115-*d* to trigger a CHO. The CHO criteria may include, for example, one or more measurement thresholds (e.g., measThreshHO_TgNB) of the target base station 105-*j* (and for any other configured target base stations), the source base station 105-*i*, or any combinations thereof. In this example, the CHO criteria may also include a validity time duration (e.g., calTimer_TgNB) for the target base station 105-*j*.

At 525, the source base station 105-*i* may transmit CHO configuration information to the UE 115-*d* in a RRC reconfiguration message. In some cases, the RRC reconfiguration message may indicate that the target base station 105-*j* is configured for CHO, may provide information for accessing the associated base stations 105 (e.g., random access information, C-RNTI, etc.), and may provide handover thresholds associated with each the target base station 105-*j*. In cases where the CHO configuration provided to the UE 115-*d* includes a validity timer, the UE 115-*d* may start the validity timer 540 associated with the target base station 105-*j*. In some cases, the source base station 105-*i* and the target base station 105-*j* may keep validity timers, and the UE 115-*d* may not keep the validity timer 540, which may simplify implementation at the UE 115-*d*. In such cases, upon expiration of the validity timer, the source base station 105-*i* may explicitly release the CHO through another RRC reconfiguration message. In cases where the UE 115-*d* keeps the validity timer 540, the UE 115-*d* may autonomously release the CHO configuration upon expiration of the validity timer 540, and the base stations 105 may also release the CHO configuration based on validity timers kept at the base stations 105.

At 530, the UE 115-*d* may determine that the condition for handover is met while the validity timer is valid. Such a determination may be made, for example, based on one or more channel quality measurements of the UE 115-*d* that are compared to the CHO configuration provided by the source base station 105-*i*. At 535, the UE 115-*d* may initiate a RACH procedure with the first target base station 105-*e* and perform the handover procedure with the target base station 105-*j*.

Figure 6:
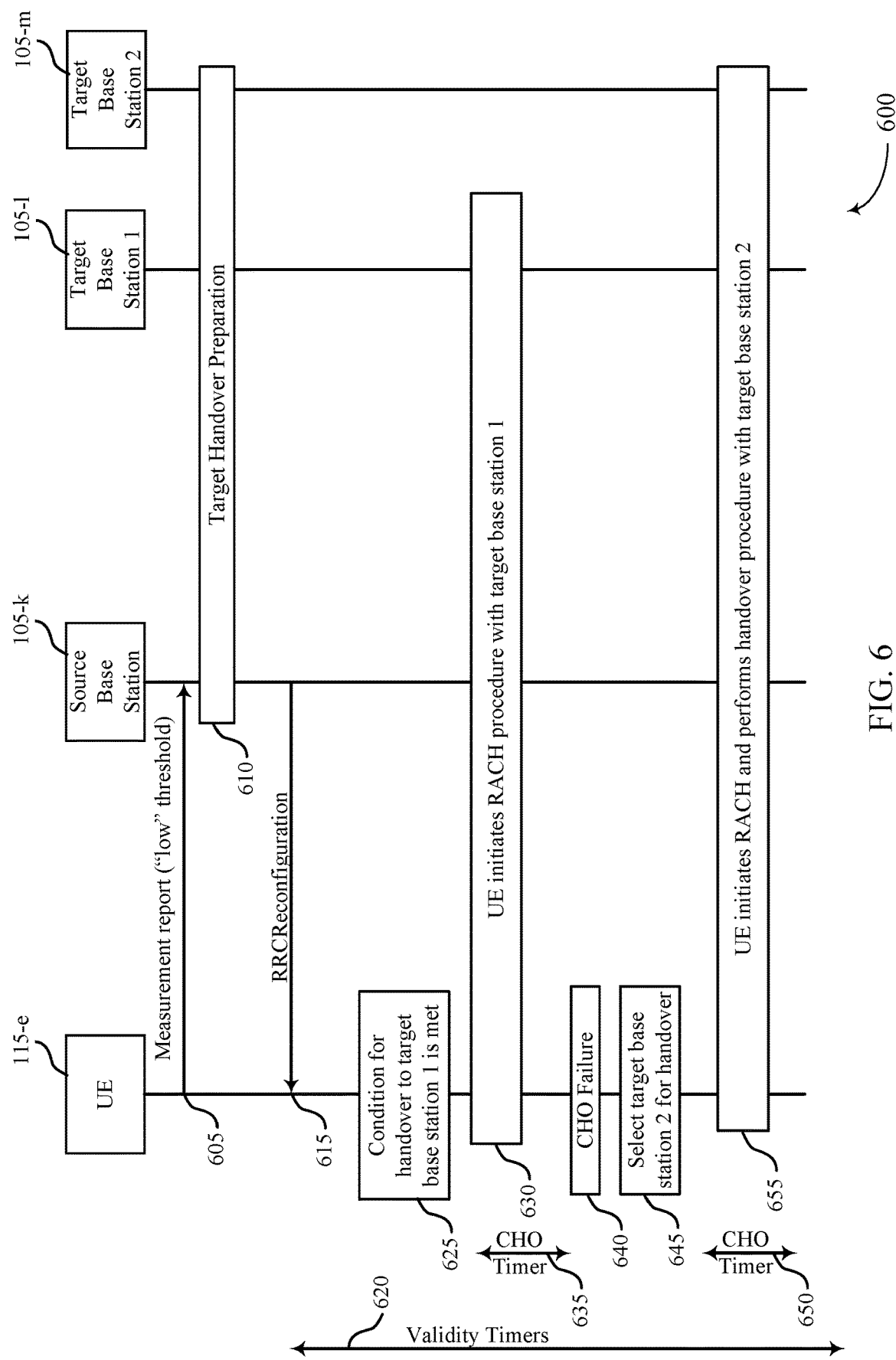

FIG. 6 illustrates an example of a process flow 600 that supports CHO deconfiguration and failure handling in wireless communications in accordance with aspects of the present disclosure. In some examples, process flow 600 may implement aspects of wireless communications system 100 or 200. The process flow in this example includes a UE 115-*e*, which may be an example of a UE described with reference to FIGS. 1 and 2; a source base station 105-*k*, a first target base station 105-*l*, and a second target base station 105-*m*, which may be examples of base stations described with reference to FIGS. 1 and 2. The process flow 600 includes functions and communications implemented by UE 115-*e* and base stations 105-*k*, 105-*l*, and 105-*m* in the context of conditional handover procedures.

In the following description of the process flow 600, the operations between UE 115-*e* and base station 105-*k*, 105-*l*, and 105-*m* may be transmitted in a different order than the order shown, or the operations may be performed in different orders or at different times. Certain operations may also be left out of the process flow 600, or other operations may be added to the process flow 600. It is to be understood that while base stations 105 and UE 115-*e* are shown performing a number of the operations of process flow 600, any wireless device may perform the operations shown.

At 605, the UE 115-*e* may transmit a measurement report to the source base station 105-*k*. The measurement report may include one or more channel measurements for the source base station 105-*k*, as well as measurements for multiple neighboring base stations, which may include the first target base station 105-*l* and the second target base station 105-*m*. The measurement report may be a "low" threshold measurement report, which may indicate that a channel measurement associated with the source base station 105-*k* is below a threshold value that is used to indicate that the source base station 105-*k* should configure a CHO for the UE 115-*e*.

At 610, the source base station 105-*k*, the first target base station 105-*l*, and the second target base station 105-*m* may perform target handover preparation (e.g., based on handover requests, admission control, and handover request acknowledgments). The handover preparation may include determination of information for use by the UE 115-*e* to establish a connection (e.g., random access preambles, C-RNTIs, etc.). The source base station 105-*k* may determine CHO criteria for each target cell for use by the UE 115-*e* to trigger a CHO. The CHO criteria may include, for example, one or more measurement thresholds of the associated target base station 105, the source base station 105-*k*, or any combinations thereof. In this example, the CHO configuration may also include a CHO timer for each target base station 105-*l* and 105-*m*. In some cases, the base stations 105 may keep validity timers 620, and may release CHO configurations of target cells upon expiry of an associated validity timer.

At 615, the source base station 105-*k* may transmit CHO configuration information to the UE 115-*e* in a RRC reconfiguration message. In some cases, the RRC reconfiguration message may indicate that the first target base station 105-*l* and the second target base station 105-*m* are configured for CHO, may provide information for accessing the associated base stations 105 (e.g., random access information, C-RNTI, etc.), and may provide handover thresholds associated with each target base station 105.

At 625, the UE 115-*e* may determine that a condition for handover to the first target base station 105-*l* is met. Such a determination may be made, for example, based on one or more channel quality measurements of the UE 115-*e* that are compared to the CHO configurations provided by the source base station 105-*k*. At 630, the UE 115-*e* may initiate a random access channel (RACH) procedure with the first target base station 105-*l*, and start CHO timer 635 associated with the first target base station 105-*l* upon transmission of an initial random access request message. In this example, at 640, the UE 115-*e* may determine a CHO failure based on an expiration of the CHO timer 635 prior to completing the random access procedure with the first target base station 105-*l*. For example, the UE 115-*e* may not receive a random access response after one or more retransmissions of the random access request while the CHO timer 635 is valid.

At 645, the UE 115-*e* may determine that a condition for handover to the second target base station 105-*m* is met. Such a determination may be made, for example, based on one or more channel quality measurements of the UE 115-*e* that are compared to the CHO configurations provided by the source base station 105-*k* while the CHO configuration of the second target base station 105-*m* is active. At 655, the UE 115-*e* may initiate a random access channel (RACH) procedure with the first target base station 105-*l*, and start CHO timer 650 associated with the second target base station 105-*m* upon transmission of an initial random access request message. In this example, the random access procedure with the second target base station 105-*m* may be successful, and the UE 115-*e* may complete the handover. In cases where the CHO timer 650 expires prior to completing the random access procedure with the second target base station 105-*m*, the UE 115-*e* may repeat the process for any other target base stations having an active CHO configuration. In cases where multiple target base stations have CHO configuration and meet conditions for handover, the UE 115-*e* may select one based on one or more predetermined criteria (e.g., the target base station with a highest channel quality, the target base station having the shortest time remaining on a validity timer, an earliest configured CHO, etc.). In cases where there is a CHO failure and no other target base stations are configured for CHO, the UE 115-*e* may declare a radio link failure and initiate a RRC connection re-establishment procedure.

Figure 7:
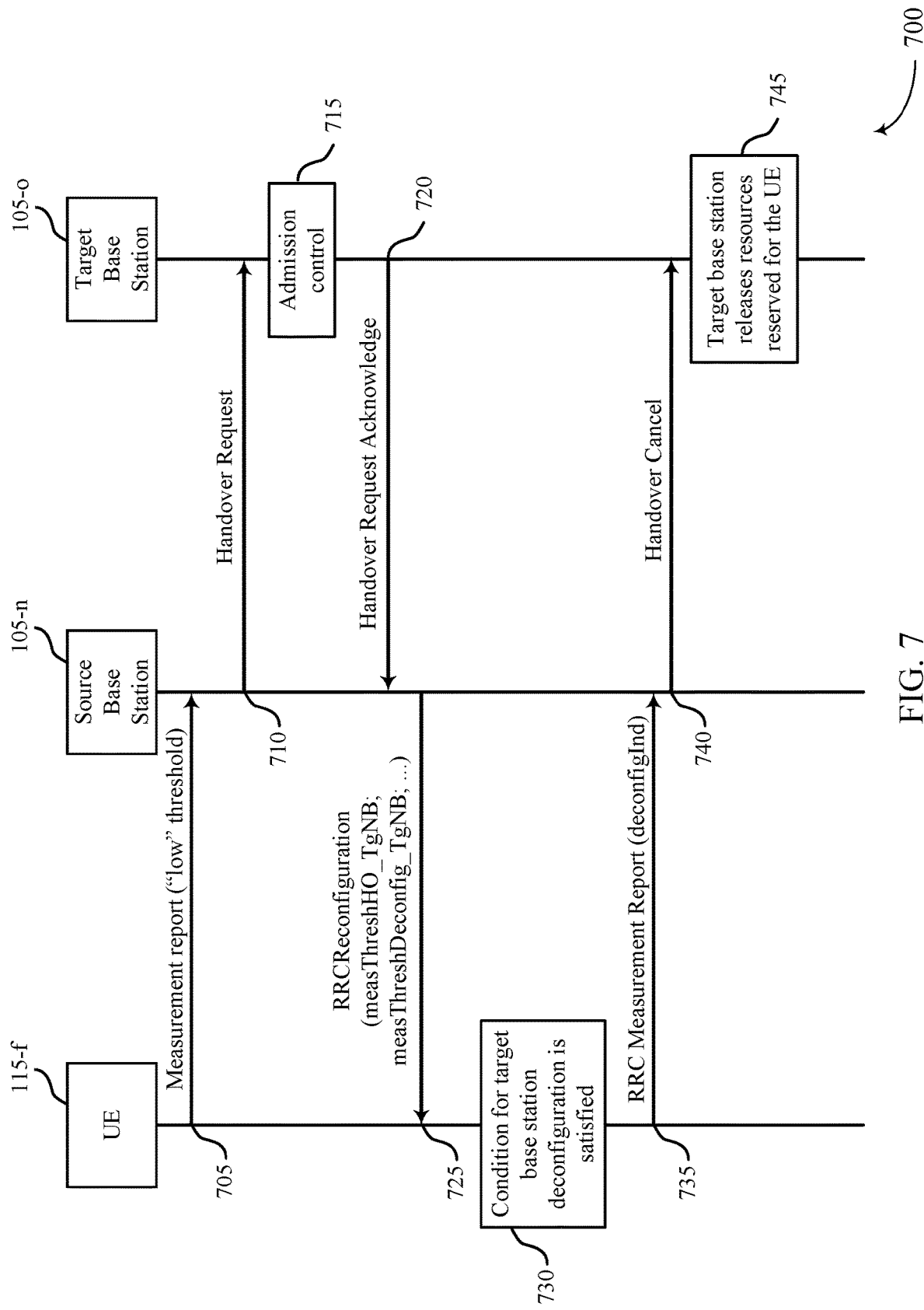

FIG. 7 illustrates an example of a process flow 700 that supports CHO deconfiguration and failure handling in wireless communications in accordance with aspects of the present disclosure. In some examples, process flow 700 may implement aspects of wireless communications system 100 or 200. The process flow in this example includes a UE 115-*f*, which may be an example of a UE described with reference to FIGS. 1 and 2; a source base station 105-*n*, and a target base station 105-*o*, which may be examples of base stations described with reference to FIGS. 1 and 2. The process flow 700 includes functions and communications implemented by UE 115-*f* and base stations 105-*n*, and 105-*o* in the context of conditional handover procedures.

In the following description of the process flow 700, the operations between UE 115-*f* and base station 105-*n* and 105-*o* may be transmitted in a different order than the order shown, or the operations may be performed in different orders or at different times. Certain operations may also be left out of the process flow 700, or other operations may be added to the process flow 700. It is to be understood that while base stations 105 and UE 115-*f* are shown performing a number of the operations of process flow 700, any wireless device may perform the operations shown.

At 705, the UE 115-*f* may transmit a measurement report to the source base station 105-*n*. The measurement report may include one or more channel measurements for the source base station 105-*n*, as well as measurements for multiple neighboring base stations, which may include the target base station 105-*o*. The measurement report may be a "low" threshold measurement report, which may indicate that a channel measurement associated with the source base station 105-*n* is below a threshold value that is used to indicate that the source base station 105-*n* should configure a CHO for the UE 115-*f*.

At 710, the source base station 105-*n* may transmit a handover request to the target base station 105-*o*. While the example of FIG. 7 illustrates a single target base station 105-*o*, in other cases multiple different target base stations may be configured for CHO and the operations of FIG. 7 may be used for any number of target base stations. In some cases, the source base station 105-*n* may select the target base station 105-*o* for the handover request based on associated measurements from the measurement report of the UE 115-*f* (e.g., based on neighboring base station measurements that are above a threshold value or that are better than other of the neighboring base station measurements). In some cases, the handover request may include handover information associated with the UE 115-*f*.

At 715, the target base station 105-*o* may perform admission control responsive to receiving the handover request. The admission control may determine that resources may be reserved for the UE 115-*f* (e.g., a C-RNTI, contention free random access resources, random access preamble, etc.).

At 720, the target base station 105-*o* may transmit a handover request acknowledgment to the source base station 105-*n*. The handover request acknowledgment may include information for use by the UE 115-*f* to establish a connection (e.g., random access preamble, C-RNTI, etc.) with the target base station 105-*o*. The source base station 105-*n* may receive the handover request acknowledgment, and determine CHO criteria for the target cell for use by the UE 115-*f* to trigger a CHO. The CHO criteria may include, for example, one or more measurement thresholds (e.g., measThreshHO_TgNB) of the target base station 105-*o* (and for any other configured target base stations), the source base station 105-*n*, or any combinations thereof. In this example, the CHO criteria may also include one or more deconfiguration criteria (e.g., measThreshDeconfig_TgNB) which, if met, trigger deconfiguration of the CHO. In some cases, the CHO criteria may also include a, and may also include a time duration for one or more timers (e.g., a validity timer, CHO timer, or both).

At 725, the source base station 105-*n* may transmit CHO configuration information to the UE 115-*f* in a RRC reconfiguration message. In some cases, the RRC reconfiguration message may indicate that the target base station 105-*o* is configured for CHO, may provide information for accessing the associated base stations 105 (e.g., random access information, C-RNTI, etc.), and may provide handover thresholds and deconfiguration thresholds associated with each the target base station 105-*o*.

At 730, the UE 115-*f* may determine that the condition for target base station 105-*o* deconfiguration is met. Such a determination may be made, for example, based on one or more channel quality measurements of the UE 115-*f* that are compared to the CHO configuration provided by the source base station 105-*n*. At 735, the UE 115-*f* may transmit a measurement report to the source base station 105-*n*. In some cases, the measurement report may indicate that the CHO configuration for the target base station 105-*o* is deconfigured. The CHO deconfiguration may include releasing the RRC configuration of the target base station 105-*o*, and the UE 115-*f* may discontinue performing measurements on and evaluating whether the target base station 105-*o* meets the handover or CHO deconfiguration criteria. In some cases, the measurement report (e.g., a RRC measurement report message) may include a deconfiguration indication.

At 740, the source base station 105-*n* may transmit a handover cancel indication to the target base station 105-*o*. The target base station 105-*o*, at 745, may release resources reserved for the UE 115-*f* responsive to the handover cancel indication.

Figure 8:
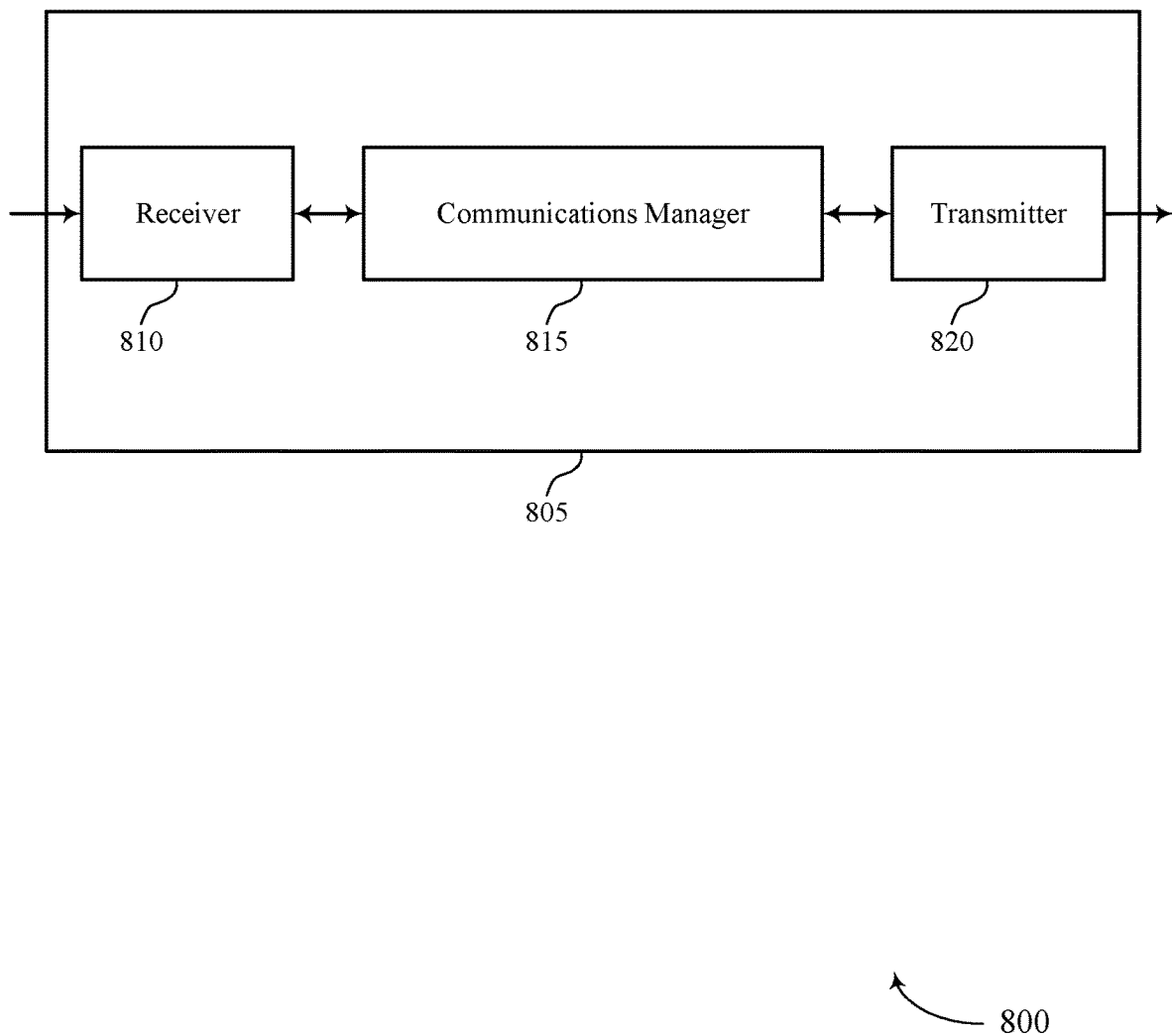
FIGS. 8 and 9 show block diagrams of devices that support CHO deconfiguration and failure handling in wireless communications in accordance with aspects of the present disclosure.

FIG. 8 shows a block diagram 800 of a device 805 that supports CHO deconfiguration and failure handling in wireless communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to CHO deconfiguration and failure handling in wireless communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a source base station, a conditional handover configuration that indicates one or more target base stations, one or more measurement thresholds for initiating a handover from the source base station to the one or more target base stations, and one or more timers associated with the handover to the one or more target base stations, determine a first conditional handover failure responsive to the first conditional handover timer expiring prior to completing the first random access procedure, determine, based on the conditional handover configuration, that a first measurement threshold for initiating the handover to a first target base station is satisfied, transmit, based on the conditional handover configuration, a first random access request to the first target base station to initiate a first random access procedure for the handover to the first target base station, and start a first conditional handover timer for completing the first random access procedure responsive to the transmitting the first random access request.

The communications manager 815 may also receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station, release the first conditional handover configuration of the first target base station, and determine, based on the conditional handover configuration, that a first deconfiguration measurement threshold for deconfiguring a first conditional handover configuration of a first target base station is satisfied. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
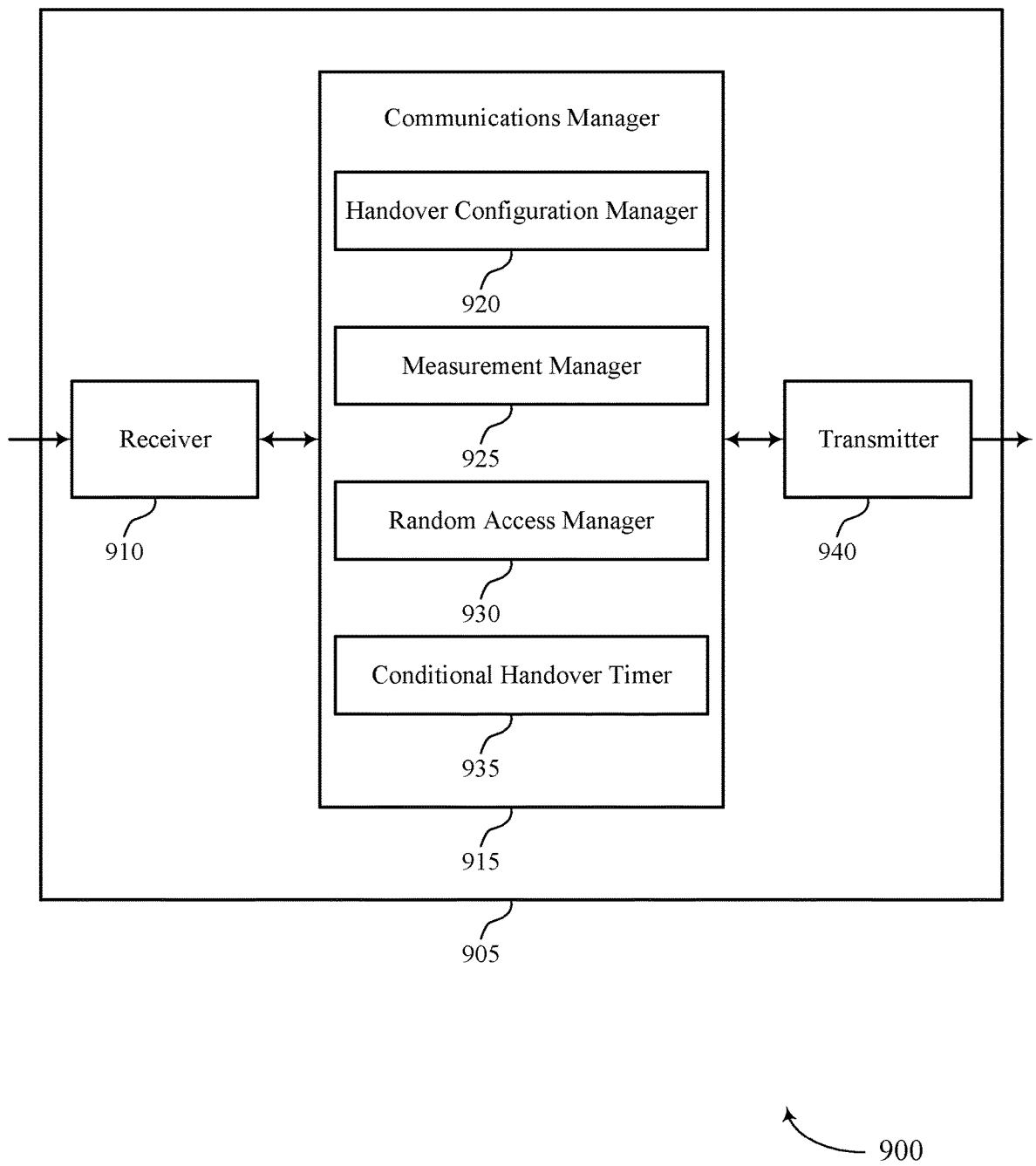

FIG. 9 shows a block diagram 900 of a device 905 that supports CHO deconfiguration and failure handling in wireless communications in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to CHO deconfiguration and failure handling in wireless communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a handover configuration manager 920, a measurement manager 925, a random access manager 930, and a conditional handover timer 935. The communications manager 915 may be an example of aspects of the communications manager 1110 described herein.

The handover configuration manager 920 may receive, from a source base station, a conditional handover configuration that indicates one or more target base stations, one or more measurement thresholds for initiating a handover from the source base station to the one or more target base stations, and one or more timers associated with the handover to the one or more target base stations and determine a first conditional handover failure responsive to the first conditional handover timer expiring prior to completing the first random access procedure.

The measurement manager 925 may determine, based on the conditional handover configuration, that a first measurement threshold for initiating the handover to a first target base station is satisfied.

The random access manager 930 may transmit, based on the conditional handover configuration, a first random access request to the first target base station to initiate a first random access procedure for the handover to the first target base station.

The conditional handover timer 935 may start a first conditional handover timer for completing the first random access procedure responsive to the transmitting the first random access request.

In some cases, the handover configuration manager 920 may receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station and release the first conditional handover configuration of the first target base station.

The measurement manager 925 may determine, based on the conditional handover configuration, that a first deconfiguration measurement threshold for deconfiguring a first conditional handover configuration of a first target base station is satisfied.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
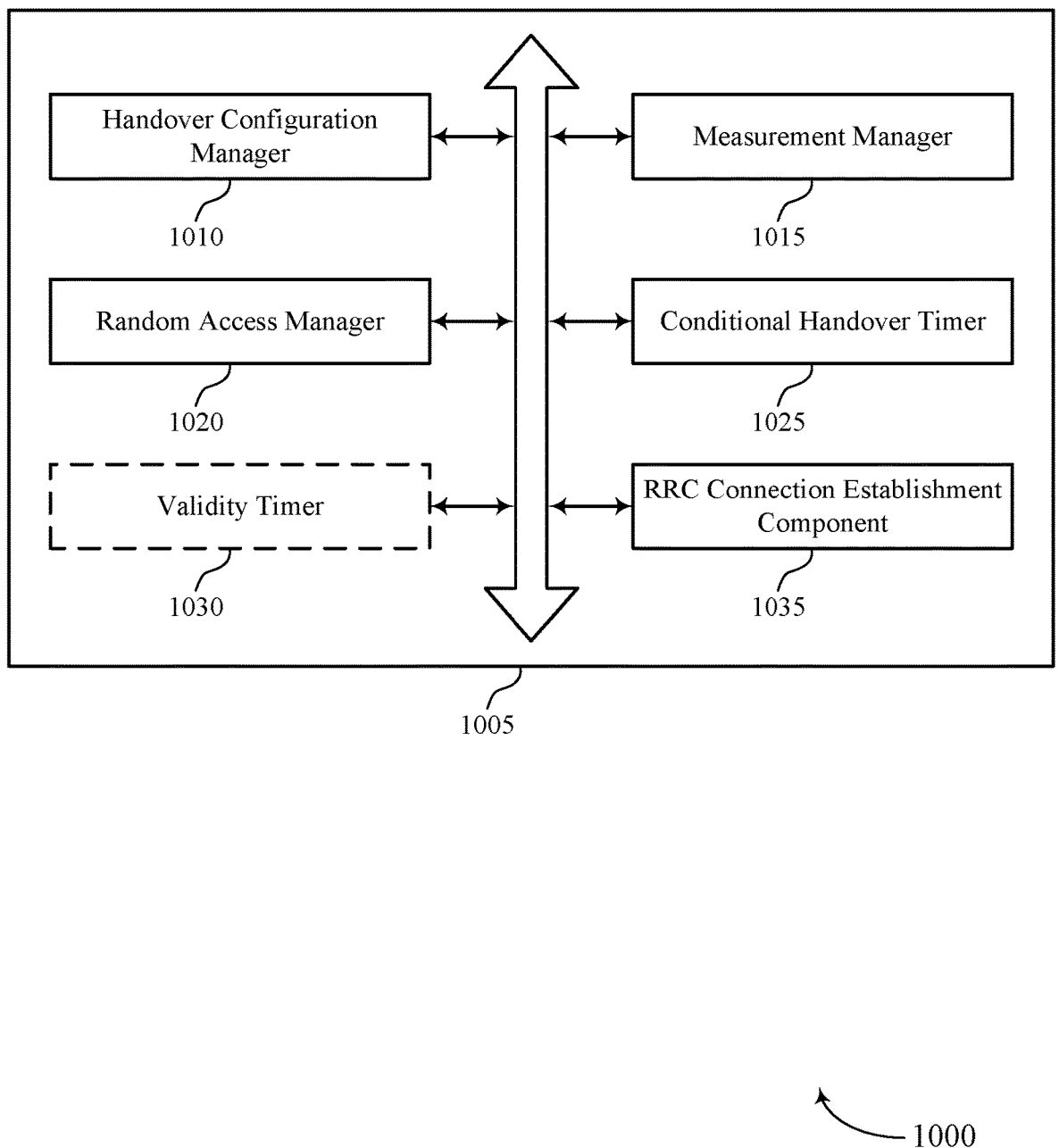
FIG. 10 shows a block diagram of a communications manager that supports CHO deconfiguration and failure handling in wireless communications in accordance with aspects of the present disclosure.

FIG. 10 shows a block diagram 1000 of a communications manager 1005 that supports CHO deconfiguration and failure handling in wireless communications in accordance with aspects of the present disclosure. The communications manager 1005 may be an example of aspects of a communications manager 815, a communications manager 915, or a communications manager 1110 described herein. The communications manager 1005 may include a handover configuration manager 1010, a measurement manager 1015, a random access manager 1020, a conditional handover timer 1025, an optional validity timer 1030, and a RRC connection establishment component 1035. Each of these modules may communicate, directly or indirectly, with one another (e.g., via one or more buses).

The handover configuration manager 1010 may receive, from a source base station, a conditional handover configuration that indicates one or more target base stations, one or more measurement thresholds for initiating a handover from the source base station to the one or more target base stations, and one or more timers associated with the handover to the one or more target base stations.

In some examples, the handover configuration manager 1010 may determine a first conditional handover failure responsive to the first conditional handover timer expiring prior to completing the first random access procedure.

In some examples, the handover configuration manager 1010 may receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station. In some examples, the handover configuration manager 1010 may release the first conditional handover configuration of the first target base station.

In some examples, the handover configuration manager 1010 may repeat the determining, transmitting, and starting timers for any other target base stations configured for conditional handover upon further conditional handover failures.

In some examples, the handover configuration manager 1010 may select, responsive to the first conditional handover timer expiring, the second target base station from a set of available target base stations based on one or more of a channel quality measurement associated with each of the set of available target base stations, an amount of time remaining on a validity timer associated with each of the set of available target base stations, or any combinations thereof.

In some examples, the handover configuration manager 1010 may delete one or more of a radio resource control configuration, a first measurement and reporting configuration for conditional handover trigger and conditional handover deconfiguration trigger, or one or more timers associated with the first target base station, that are provided in the first conditional handover configuration.

In some examples, the handover configuration manager 1010 may discontinue conditional handover measurements associated with the first target base station and evaluating whether the measurements meet conditional handover criteria or conditional handover deconfiguration criteria. In some cases, the one or more timers include at least the first conditional handover timer for completing the first random access procedure with the first target base station.

In some cases, the first deconfiguration measurement threshold is a channel quality threshold associated with the first target base station, and where the first conditional handover configuration is released responsive to a channel quality measurement of the first target base station being below the channel quality threshold. In some cases, the first deconfiguration measurement threshold includes a first threshold value associated with the source base station and a second threshold value associated with the first target base station, and where the first conditional handover configuration is released responsive to a first channel quality measurement of the source base station exceeding the first threshold and a second channel quality measurement of the first target base station being below the second threshold value. In some cases, the first deconfiguration measurement threshold is a difference threshold, and where the first conditional handover configuration is released responsive to a difference between channel quality measurements of the source base station and the first target base station exceeding the difference threshold.

The measurement manager 1015 may determine, based on the conditional handover configuration, that a first measurement threshold for initiating the handover to a first target base station is satisfied.

In some examples, the measurement manager 1015 may determine, based on the conditional handover configuration, that a first deconfiguration measurement threshold for deconfiguring a first conditional handover configuration of a first target base station is satisfied.

In some examples, the measurement manager 1015 may determine, responsive to the first conditional handover timer expiring, that a second measurement threshold for initiating a handover to a second target base station is satisfied.

In some examples, the measurement manager 1015 may determine, based on the conditional handover configuration, that a second triggering measurement threshold for initiating a handover to a second target base station is satisfied.

In some examples, the measurement manager 1015 may transmit a measurement report to the source base station that indicates the first conditional handover configuration of the first target base station is released. In some cases, the measurement report contains a deconfiguration indication for the first target base station.

The random access manager 1020 may transmit, based on the conditional handover configuration, a first random access request to the first target base station to initiate a first random access procedure for the handover to the first target base station.

In some examples, the random access manager 1020 may transmit, based on the conditional handover configuration, a second random access request to the second target base station to initiate a second random access procedure for the handover to the second target base station.

The conditional handover timer 1025 may start a first conditional handover timer for completing the first random access procedure responsive to the transmitting the first random access request. In some examples, the conditional handover timer 1025 may start a second conditional handover timer for completing the second random access procedure. In some cases, a first duration of the first conditional handover timer is different than a second duration of the second conditional handover timer.

The validity timer 1030, if present, may initiate, responsive to receiving the conditional handover configuration, the first validity timer and the second validity timer. In some examples, the validity timer 1030 may delete the second conditional handover configuration responsive to an expiration of the second validity timer. In some examples, the validity timer 1030 may stop the first validity timer upon transmitting the first random access request to the first target base station.

The RRC connection establishment component 1035 may initiate a connection re-establishment procedure upon determining that no other target base stations are configured for conditional handover.

Figure 11:
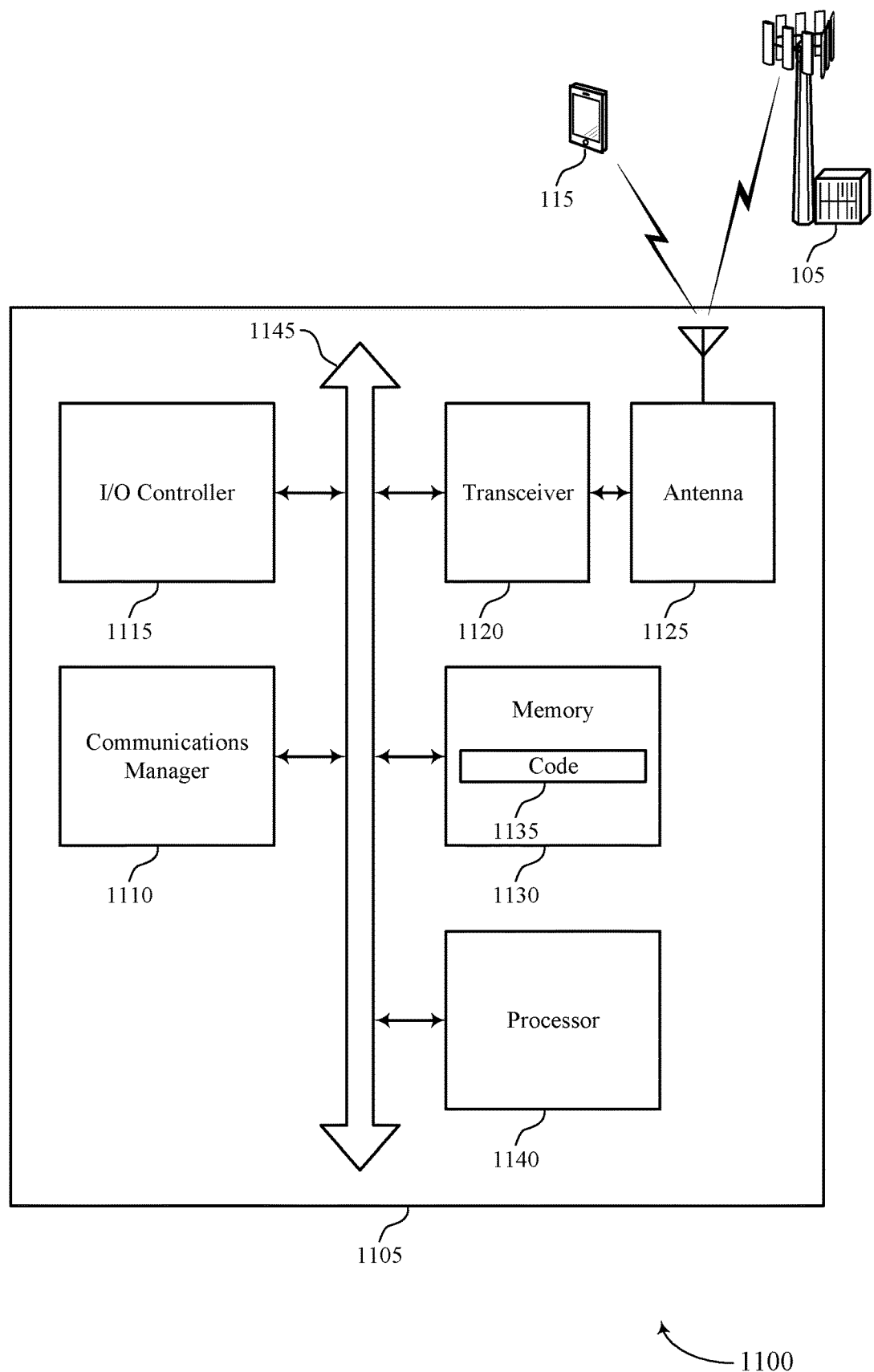
FIG. 11 shows a diagram of a system including a device that supports CHO deconfiguration and failure handling in wireless communications in accordance with aspects of the present disclosure.

FIG. 11 shows a diagram of a system 1100 including a device 1105 that supports CHO deconfiguration and failure handling in wireless communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a source base station, a conditional handover configuration that indicates one or more target base stations, one or more measurement thresholds for initiating a handover from the source base station to the one or more target base stations, and one or more timers associated with the handover to the one or more target base stations, determine a first conditional handover failure responsive to the first conditional handover timer expiring prior to completing the first random access procedure, determine, based on the conditional handover configuration, that a first measurement threshold for initiating the handover to a first target base station is satisfied, transmit, based on the conditional handover configuration, a first random access request to the first target base station to initiate a first random access procedure for the handover to the first target base station, and start a first conditional handover timer for completing the first random access procedure responsive to the transmitting the first random access request.

The communications manager 1110 may also receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station, release the first conditional handover configuration of the first target base station, and determine, based on the conditional handover configuration, that a first deconfiguration measurement threshold for deconfiguring a first conditional handover configuration of a first target base station is satisfied.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting CHO deconfiguration and failure handling in wireless communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
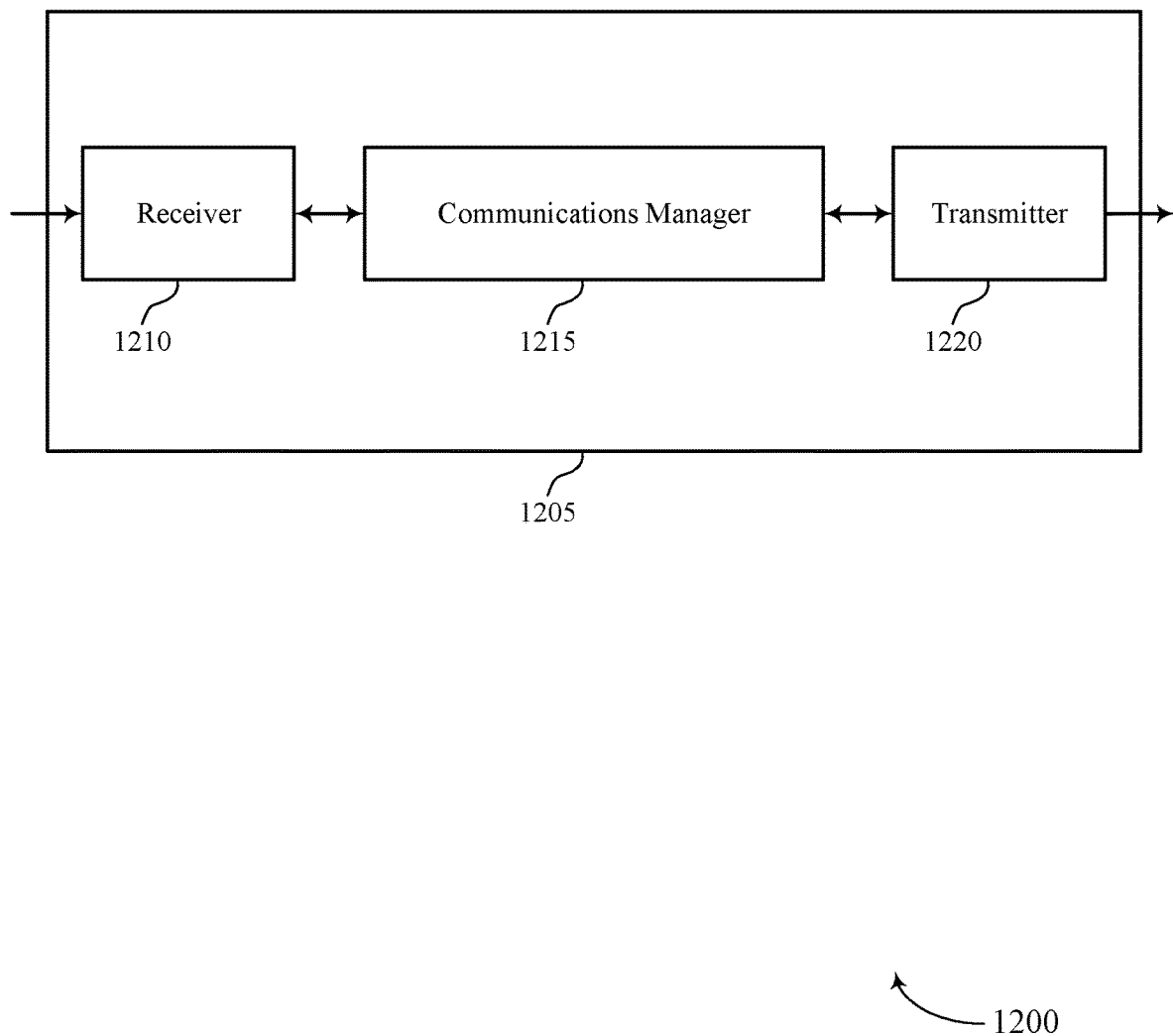
FIGS. 12 and 13 show block diagrams of devices that support CHO deconfiguration and failure handling in wireless communications in accordance with aspects of the present disclosure.

FIG. 12 shows a block diagram 1200 of a device 1205 that supports CHO deconfiguration and failure handling in wireless communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to CHO deconfiguration and failure handling in wireless communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station and transmit, to the UE, the one or more conditional handover configurations that each indicate an associated target base station, one or more measurement thresholds for initiating the handover of the UE from the source base station to the associated target base station, and the conditional handover time period of the associated target base station.

The communications manager 1215 may also establish, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station and a conditional handover timer value for completing the conditional handover of the UE to the associated target base station, and transmit, to the UE, the one or more conditional handover configurations that each indicate the associated target base station, the triggering measurement threshold for initiating the conditional handover to the associated target base station and the conditional handover timer value for completing the conditional handover of the UE to the associated target base station. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
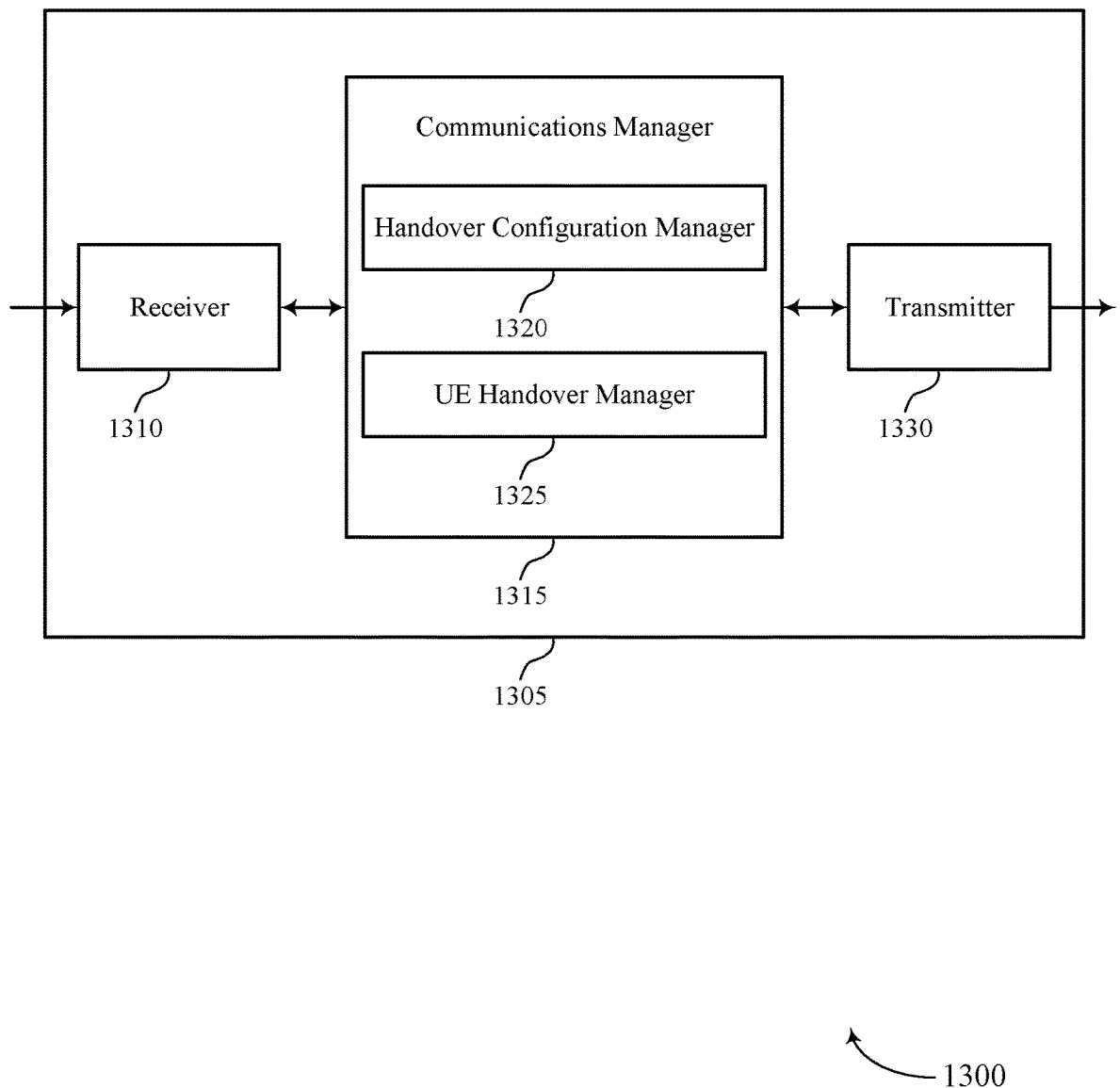

FIG. 13 shows a block diagram 1300 of a device 1305 that supports CHO deconfiguration and failure handling in wireless communications in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to CHO deconfiguration and failure handling in wireless communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a handover configuration manager 1320 and an UE handover manager 1325. The communications manager 1315 may be an example of aspects of the communications manager 1510 described herein.

The handover configuration manager 1320 may establish, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station.

The UE handover manager 1325 may transmit, to the UE, the one or more conditional handover configurations that each indicate an associated target base station, one or more measurement thresholds for initiating the handover of the UE from the source base station to the associated target base station, and the conditional handover time period of the associated target base station.

The handover configuration manager 1320 may establish, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station and a conditional handover timer value for completing the conditional handover of the UE to the associated target base station.

The UE handover manager 1325 may transmit, to the UE, the one or more conditional handover configurations that each indicate the associated target base station, the triggering measurement threshold for initiating the conditional handover to the associated target base station, and the conditional handover timer value for completing the conditional handover of the UE to the associated target base station.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
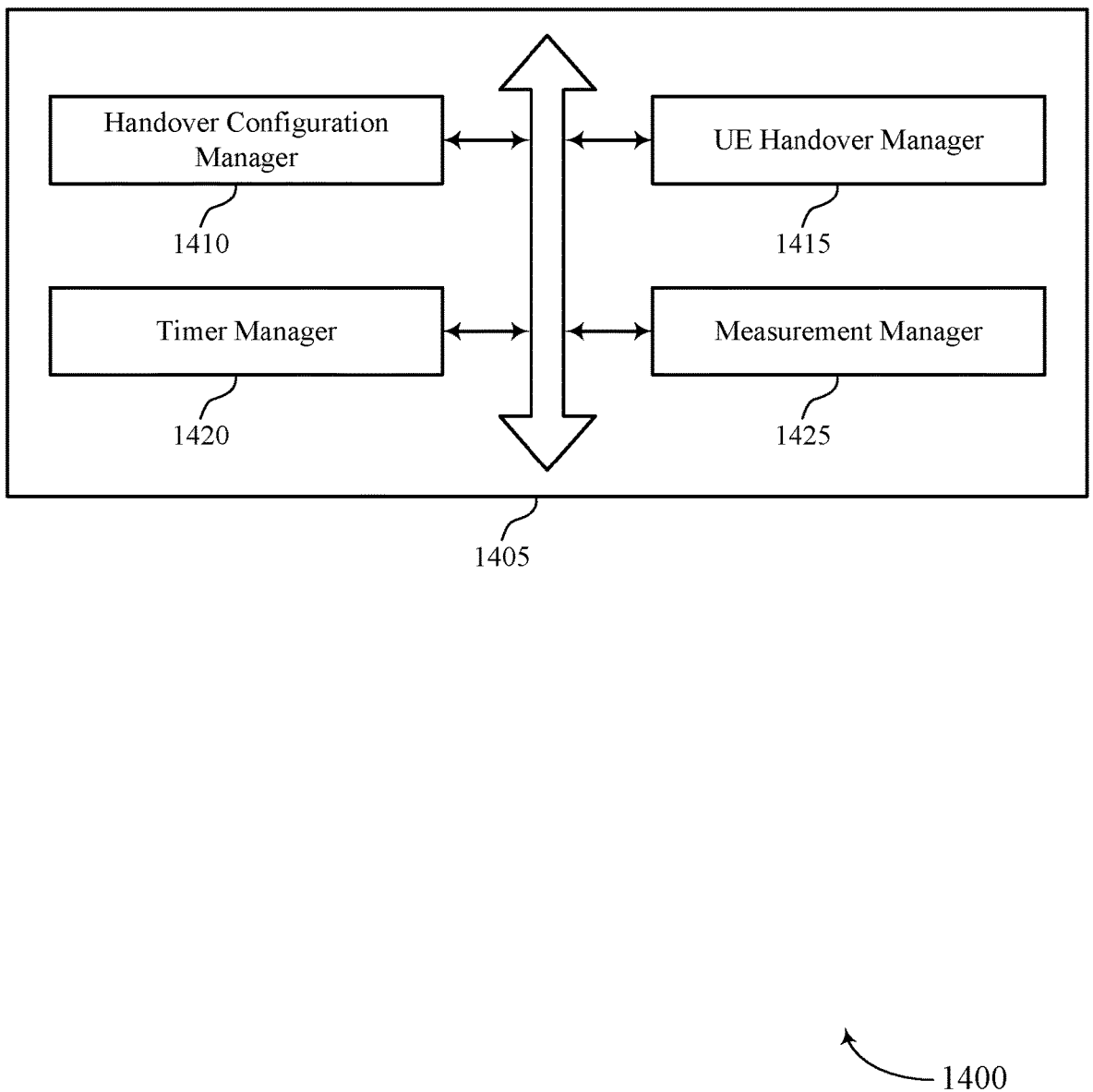
FIG. 14 shows a block diagram of a communications manager that supports CHO deconfiguration and failure handling in wireless communications in accordance with aspects of the present disclosure.

FIG. 14 shows a block diagram 1400 of a communications manager 1405 that supports CHO deconfiguration and failure handling in wireless communications in accordance with aspects of the present disclosure. The communications manager 1405 may be an example of aspects of a communications manager 1215, a communications manager 1315, or a communications manager 1510 described herein. The communications manager 1405 may include a handover configuration manager 1410, an UE handover manager 1415, a timer manager 1420, and a measurement manager 1425. Each of these modules may communicate, directly or indirectly, with one another (e.g., via one or more buses).

The handover configuration manager 1410 may establish, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station.

In some examples, the handover configuration manager 1410 may establish, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station and a deconfiguration measurement threshold for deconfiguring the conditional handover configuration of the associated target base station.

In some examples, the handover configuration manager 1410 may release the first conditional handover configuration of the first target base station responsive to the measurement report. In some examples, the handover configuration manager 1410 may delete one or more of a radio resource control configuration, the first deconfiguration measurement threshold, a first triggering measurement threshold, or one or more timers associated with the first target base station, that are included in the first conditional handover configuration. In some examples, the handover configuration manager 1410 may provide an indication to the first target base station that the first conditional handover configuration is released.

In some cases, the deconfiguration measurement threshold is a channel quality threshold associated with each respective target base station, and where the conditional handover configuration of a first target base station is released responsive to a channel quality measurement of the first target base station being below the channel quality threshold of the first target base station. In some cases, the deconfiguration measurement threshold includes a first threshold value associated with the source base station and a second threshold value for each respective target base station, and where the conditional handover configuration of a first target base station is released responsive to a first channel quality measurement of the source base station exceeding the first threshold and a second channel quality measurement of the first target base station being below the second threshold value of the first target base station. In some cases, the deconfiguration measurement threshold is a difference threshold, and where the conditional handover configuration associated with a first target base station is released responsive to a difference between channel quality measurements of the source base station and the first target base station exceeding the difference threshold.

The UE handover manager 1415 may transmit, to the UE, the one or more conditional handover configurations that each indicate an associated target base station, one or more measurement thresholds for initiating the handover of the UE from the source base station to the associated target base station, and the conditional handover time period of the associated target base station.

In some examples, the UE handover manager 1415 may transmit, to the UE, the one or more conditional handover configurations that each indicate the associated target base station, the triggering measurement threshold for initiating the conditional handover to the associated target base station, and the deconfiguration measurement threshold for deconfiguring the conditional handover configuration of the associated target base station. In some cases, the UE autonomously deconfigures the first conditional handover configuration of the first target base station based on the expiration of the first validity time period.

The timer manager 1420 may manage one or more times associated with CHO. In some cases the conditional handover time period is determined based on one or more of an estimate of movement of the UE relative to each respective target base station, a traffic load of the source base station or each respective target base station, channel quality measurements for each respective target base station provided by the UE, or any combinations thereof.

The measurement manager 1425 may receive, from the UE, a measurement report that indicates that a first deconfiguration measurement threshold for deconfiguring a first conditional handover configuration of a first target base station is satisfied.

Figure 15:
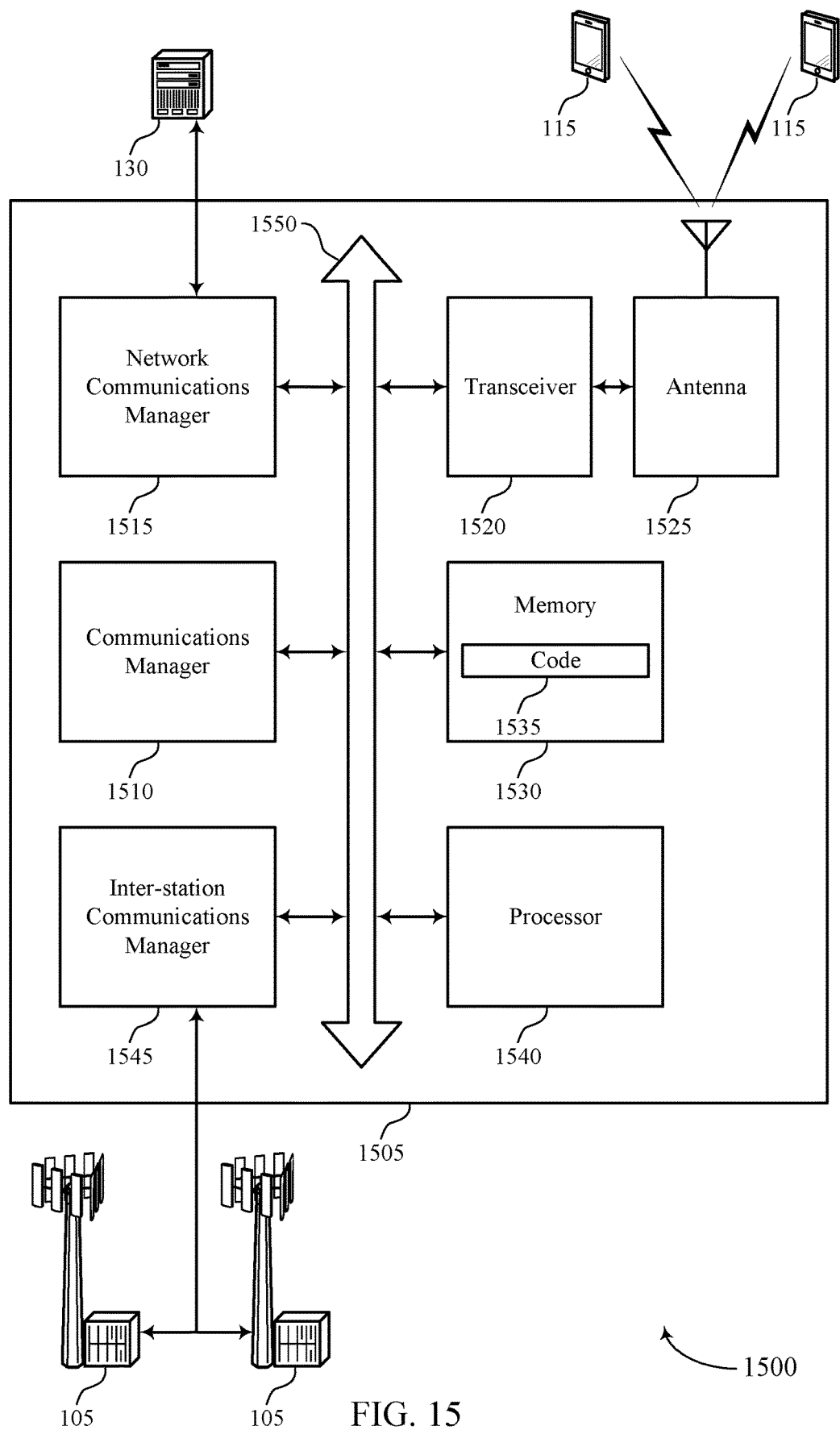
FIG. 15 shows a diagram of a system including a device that supports CHO deconfiguration and failure handling in wireless communications in accordance with aspects of the present disclosure.

FIG. 15 shows a diagram of a system 1500 including a device 1505 that supports CHO deconfiguration and failure handling in wireless communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may establish, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station and transmit, to the UE, the one or more conditional handover configurations that each indicate an associated target base station, one or more measurement thresholds for initiating the handover of the UE from the source base station to the associated target base station, and the conditional handover time period of the associated target base station.

The communications manager 1510 may also establish, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station and a conditional handover timer value for completing the conditional handover of the UE to the associated target base station, and transmit, to the UE, the one or more conditional handover configurations that each indicate the associated target base station, the triggering measurement threshold for initiating the conditional handover to the associated target base station, and the conditional handover timer value for completing the conditional handover of the UE to the associated target base station.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting CHO deconfiguration and failure handling in wireless communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
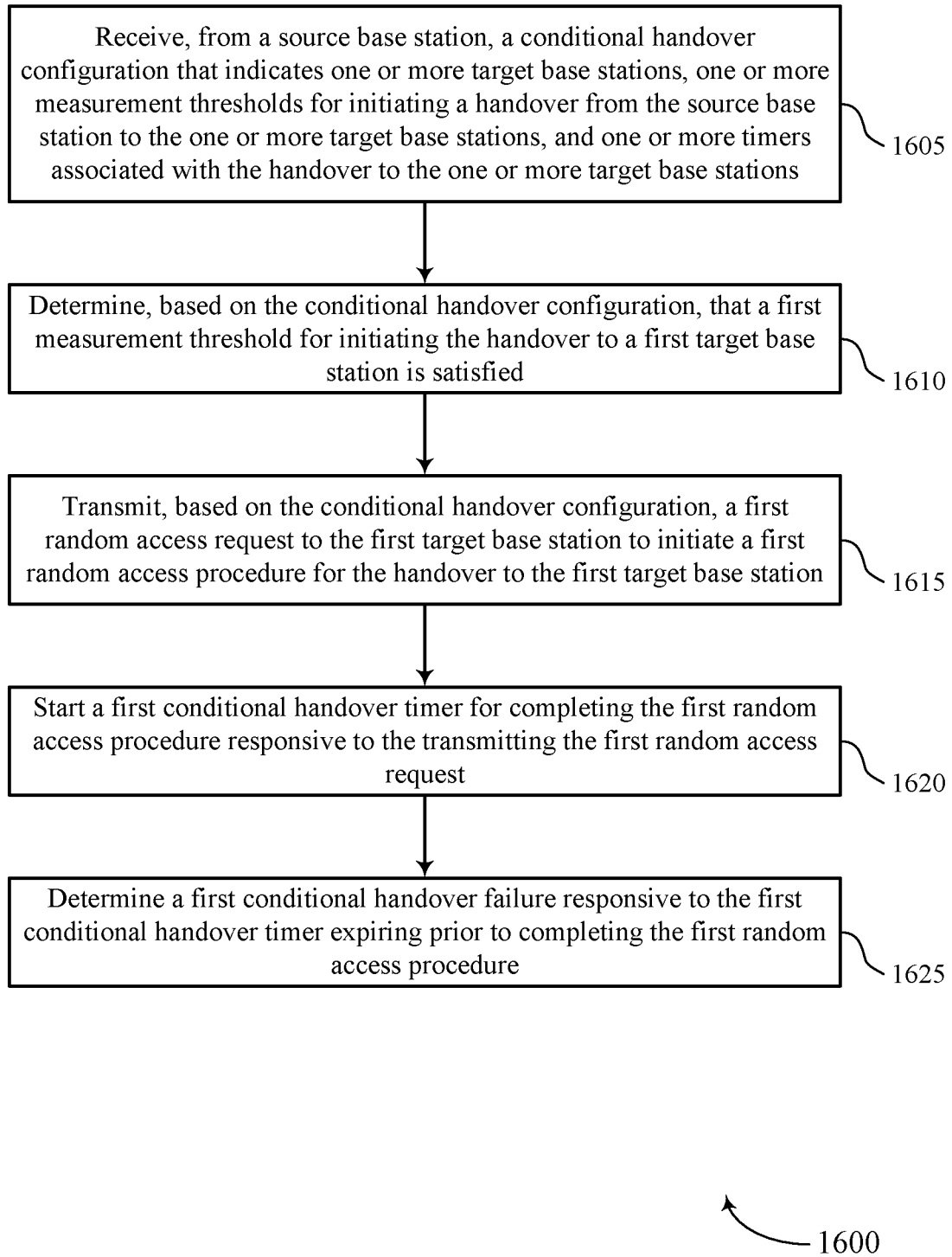
FIGS. 16 through 22 show flowcharts illustrating methods that support CHO deconfiguration and failure handling in wireless communications in accordance with aspects of the present disclosure.

FIG. 16 shows a flowchart illustrating a method 1600 that supports CHO deconfiguration and failure handling in wireless communications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a source base station, a conditional handover configuration that indicates one or more target base stations, one or more measurement thresholds for initiating a handover from the source base station to the one or more target base stations, and one or more timers associated with the handover to the one or more target base stations. The operations of 1605 may be performed according to the methods described herein. In some examples, aspects of the operations of 1605 may be performed by a handover configuration manager as described with reference to FIGS. 8 through 11.

At 1610, the UE may determine, based on the conditional handover configuration, that a first measurement threshold for initiating the handover to a first target base station is satisfied. The operations of 1610 may be performed according to the methods described herein. In some examples, aspects of the operations of 1610 may be performed by a measurement manager as described with reference to FIGS. 8 through 11.

At 1615, the UE may transmit, based on the conditional handover configuration, a first random access request to the first target base station to initiate a first random access procedure for the handover to the first target base station. The operations of 1615 may be performed according to the methods described herein. In some examples, aspects of the operations of 1615 may be performed by a random access manager as described with reference to FIGS. 8 through 11.

At 1620, the UE may start a first conditional handover timer for completing the first random access procedure responsive to the transmitting the first random access request. The operations of 1620 may be performed according to the methods described herein. In some examples, aspects of the operations of 1620 may be performed by a conditional handover timer as described with reference to FIGS. 8 through 11.

At 1625, the UE may determine a first conditional handover failure responsive to the first conditional handover timer expiring prior to completing the first random access procedure. The operations of 1625 may be performed according to the methods described herein. In some examples, aspects of the operations of 1625 may be performed by a handover configuration manager as described with reference to FIGS. 8 through 11.

Figure 17:
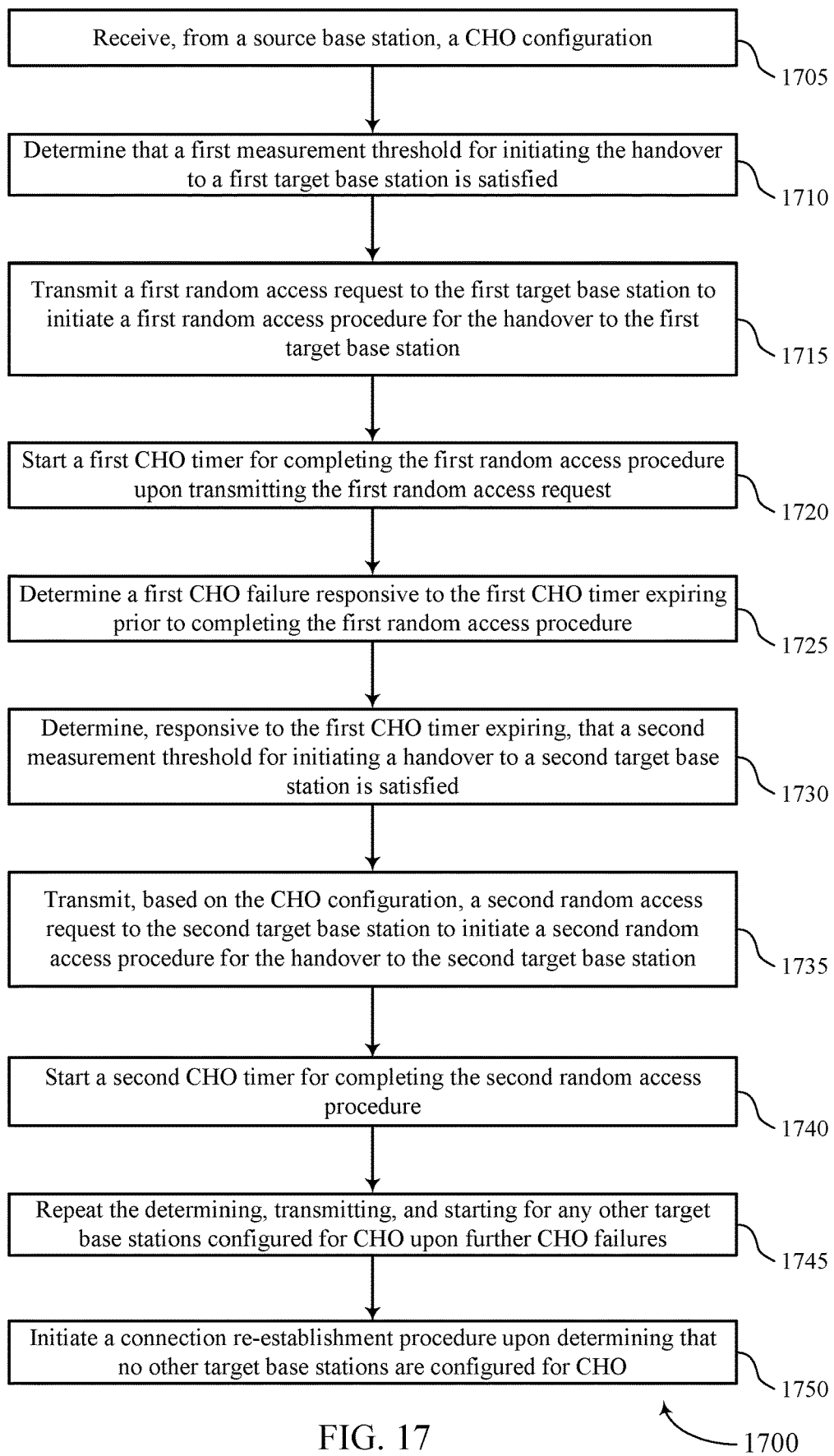

FIG. 17 shows a flowchart illustrating a method 1700 that supports CHO deconfiguration and failure handling in wireless communications in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a source base station, a conditional handover configuration that indicates one or more target base stations, one or more measurement thresholds for initiating a handover from the source base station to the one or more target base stations, and one or more timers associated with the handover to the one or more target base stations. The operations of 1705 may be performed according to the methods described herein. In some examples, aspects of the operations of 1705 may be performed by a handover configuration manager as described with reference to FIGS. 8 through 11.

At 1710, the UE may determine, based on the conditional handover configuration, that a first measurement threshold for initiating the handover to a first target base station is satisfied. The operations of 1710 may be performed according to the methods described herein. In some examples, aspects of the operations of 1710 may be performed by a measurement manager as described with reference to FIGS. 8 through 11.

At 1715, the UE may transmit, based on the conditional handover configuration, a first random access request to the first target base station to initiate a first random access procedure for the handover to the first target base station. The operations of 1715 may be performed according to the methods described herein. In some examples, aspects of the operations of 1715 may be performed by a random access manager as described with reference to FIGS. 8 through 11.

At 1720, the UE may start a first conditional handover timer for completing the first random access procedure responsive to the transmitting the first random access request. The operations of 1720 may be performed according to the methods described herein. In some examples, aspects of the operations of 1720 may be performed by a conditional handover timer as described with reference to FIGS. 8 through 11.

At 1725, the UE may determine a first conditional handover failure responsive to the first conditional handover timer expiring prior to completing the first random access procedure. The operations of 1725 may be performed according to the methods described herein. In some examples, aspects of the operations of 1725 may be performed by a handover configuration manager as described with reference to FIGS. 8 through 11.

At 1730, the UE may determine, responsive to the first conditional handover timer expiring, that a second measurement threshold for initiating a handover to a second target base station is satisfied. The operations of 1730 may be performed according to the methods described herein. In some examples, aspects of the operations of 1730 may be performed by a measurement manager as described with reference to FIGS. 8 through 11.

At 1735, the UE may transmit, based on the conditional handover configuration, a second random access request to the second target base station to initiate a second random access procedure for the handover to the second target base station. The operations of 1735 may be performed according to the methods described herein. In some examples, aspects of the operations of 1735 may be performed by a random access manager as described with reference to FIGS. 8 through 11.

At 1740, the UE may start a second conditional handover timer for completing the second random access procedure. The operations of 1740 may be performed according to the methods described herein. In some examples, aspects of the operations of 1740 may be performed by a conditional handover timer as described with reference to FIGS. 8 through 11.

At 1745, the UE may repeat the determining, transmitting, and starting for any other target base stations configured for conditional handover upon further conditional handover failures. The operations of 1745 may be performed according to the methods described herein. In some examples, aspects of the operations of 1745 may be performed by a handover configuration manager as described with reference to FIGS. 8 through 11.

At 1750, the UE may initiate a connection re-establishment procedure upon determining that no other target base stations are configured for conditional handover. The operations of 1750 may be performed according to the methods described herein. In some examples, aspects of the operations of 1750 may be performed by a RRC connection establishment component as described with reference to FIGS. 8 through 11.

Figure 18:
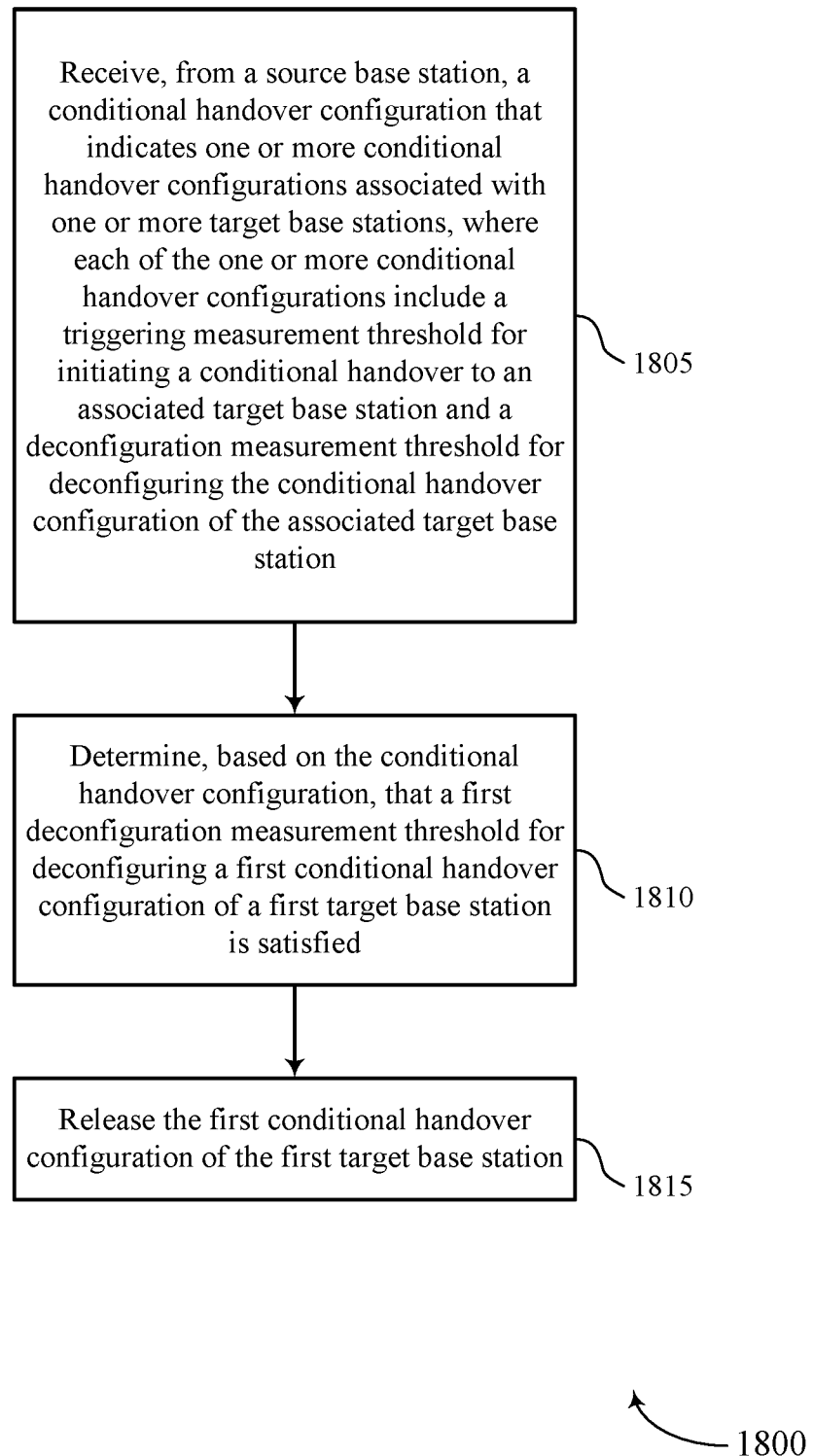

FIG. 18 shows a flowchart illustrating a method 1800 that supports CHO deconfiguration and failure handling in wireless communications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station. The operations of 1805 may be performed according to the methods described herein. In some examples, aspects of the operations of 1805 may be performed by a handover configuration manager as described with reference to FIGS. 8 through 11.

At 1810, the UE may determine, based on the conditional handover configuration, that a first deconfiguration measurement threshold for deconfiguring a first conditional handover configuration of a first target base station is satisfied. The operations of 1810 may be performed according to the methods described herein. In some examples, aspects of the operations of 1810 may be performed by a measurement manager as described with reference to FIGS. 8 through 11.

At 1815, the UE may release the first conditional handover configuration of the first target base station. The operations of 1815 may be performed according to the methods described herein. In some examples, aspects of the operations of 1815 may be performed by a handover configuration manager as described with reference to FIGS. 8 through 11.

Figure 19:
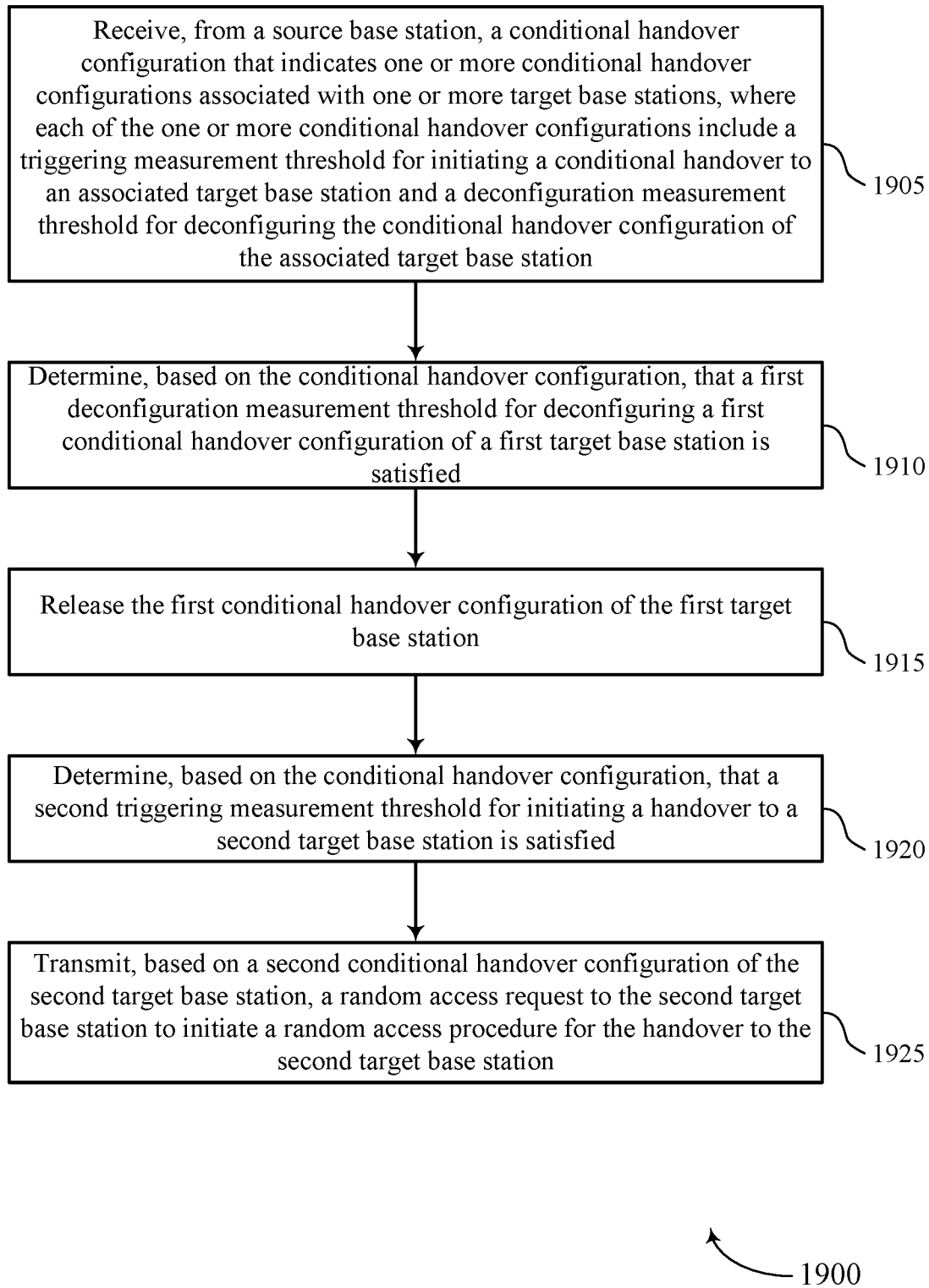

FIG. 19 shows a flowchart illustrating a method 1900 that supports CHO deconfiguration and failure handling in wireless communications in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station. The operations of 1905 may be performed according to the methods described herein. In some examples, aspects of the operations of 1905 may be performed by a handover configuration manager as described with reference to FIGS. 8 through 11.

At 1910, the UE may determine, based on the conditional handover configuration, that a first deconfiguration measurement threshold for deconfiguring a first conditional handover configuration of a first target base station is satisfied. The operations of 1910 may be performed according to the methods described herein. In some examples, aspects of the operations of 1910 may be performed by a measurement manager as described with reference to FIGS. 8 through 11.

At 1915, the UE may release the first conditional handover configuration of the first target base station. The operations of 1915 may be performed according to the methods described herein. In some examples, aspects of the operations of 1915 may be performed by a handover configuration manager as described with reference to FIGS. 8 through 11.

At 1920, the UE may determine, based on the conditional handover configuration, that a second triggering measurement threshold for initiating a handover to a second target base station is satisfied. The operations of 1920 may be performed according to the methods described herein. In some examples, aspects of the operations of 1920 may be performed by a measurement manager as described with reference to FIGS. 8 through 11.

At 1925, the UE may transmit, based on a second conditional handover configuration of the second target base station, a random access request to the second target base station to initiate a random access procedure for the handover to the second target base station. The operations of 1925 may be performed according to the methods described herein. In some examples, aspects of the operations of 1925 may be performed by a random access manager as described with reference to FIGS. 8 through 11.

Figure 20:
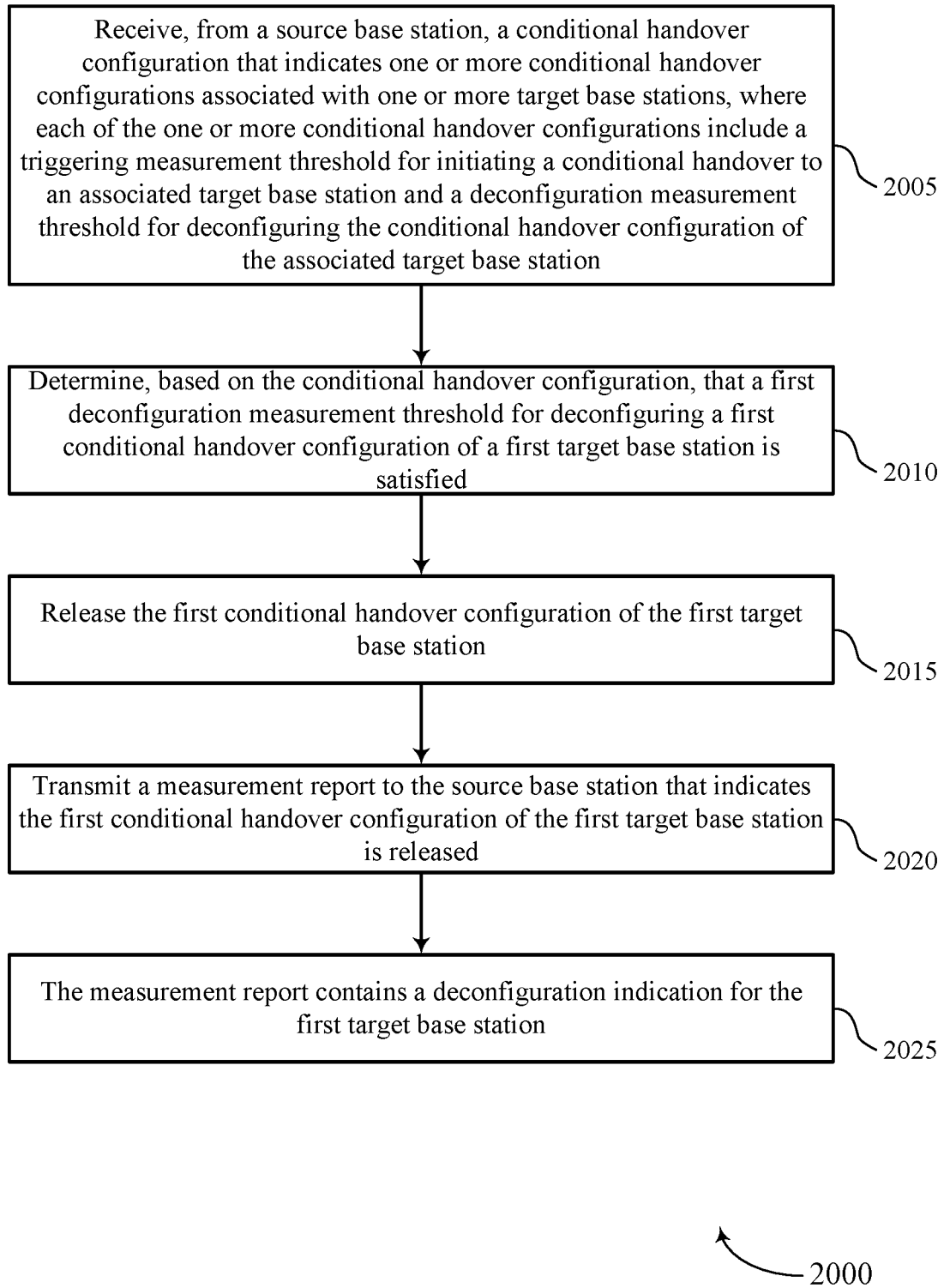

FIG. 20 shows a flowchart illustrating a method 2000 that supports CHO deconfiguration and failure handling in wireless communications in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive, from a source base station, a conditional handover configuration that indicates one or more conditional handover configurations associated with one or more target base stations, where each of the one or more conditional handover configurations include a triggering measurement threshold for initiating a conditional handover to an associated target base station and a deconfiguration measurement threshold for deconfiguring the conditional handover configuration of the associated target base station. The operations of 2005 may be performed according to the methods described herein. In some examples, aspects of the operations of 2005 may be performed by a handover configuration manager as described with reference to FIGS. 8 through 11.

At 2010, the UE may determine, based on the conditional handover configuration, that a first deconfiguration measurement threshold for deconfiguring a first conditional handover configuration of a first target base station is satisfied. The operations of 2010 may be performed according to the methods described herein. In some examples, aspects of the operations of 2010 may be performed by a measurement manager as described with reference to FIGS. 8 through 11.

At 2015, the UE may release the first conditional handover configuration of the first target base station. The operations of 2015 may be performed according to the methods described herein. In some examples, aspects of the operations of 2015 may be performed by a handover configuration manager as described with reference to FIGS. 8 through 11.

At 2020, the UE may transmit a measurement report to the source base station that indicates the first conditional handover configuration of the first target base station is released. The operations of 2020 may be performed according to the methods described herein. In some examples, aspects of the operations of 2020 may be performed by a measurement manager as described with reference to FIGS. 8 through 11.

At 2025, the UE may the measurement report contains a deconfiguration indication for the first target base station. The operations of 2025 may be performed according to the methods described herein. In some examples, aspects of the operations of 2025 may be performed by a measurement manager as described with reference to FIGS. 8 through 11.

Figure 21:
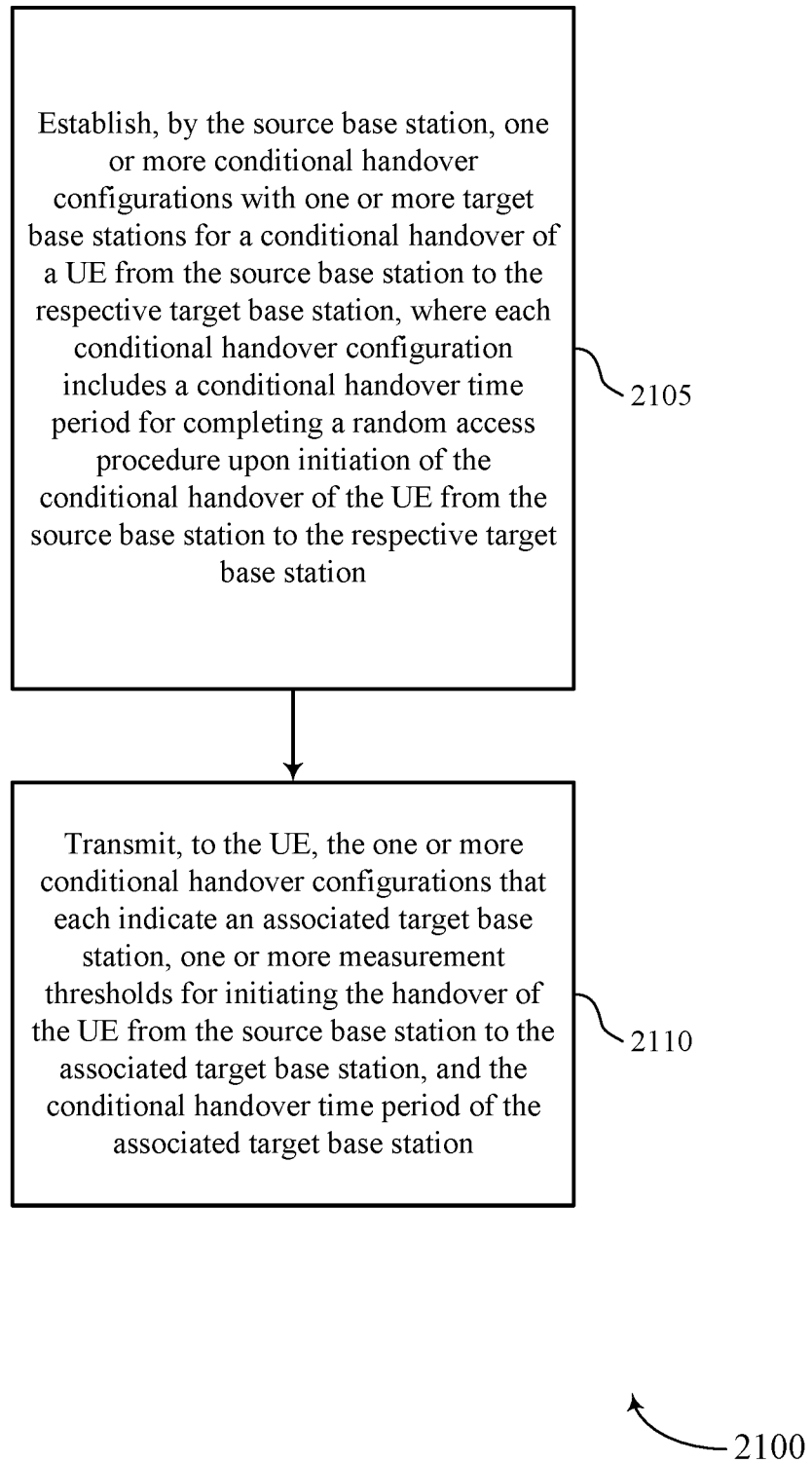

FIG. 21 shows a flowchart illustrating a method 2100 that supports CHO deconfiguration and failure handling in wireless communications in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may establish, by the source base station, one or more conditional handover configurations with one or more target base stations for a conditional handover of a UE from the source base station to the respective target base station, where each conditional handover configuration includes a conditional handover time period for completing a random access procedure upon initiation of the conditional handover of the UE from the source base station to the respective target base station. The operations of 2105 may be performed according to the methods described herein. In some examples, aspects of the operations of 2105 may be performed by a handover configuration manager as described with reference to FIGS. 12 through 15.

At 2110, the base station may transmit, to the UE, the one or more conditional handover configurations that each indicate an associated target base station, one or more measurement thresholds for initiating the handover of the UE from the source base station to the associated target base station, and the conditional handover time period of the associated target base station. The operations of 2110 may be performed according to the methods described herein. In some examples, aspects of the operations of 2110 may be performed by an UE handover manager as described with reference to FIGS. 12 through 15.

Figure 22:
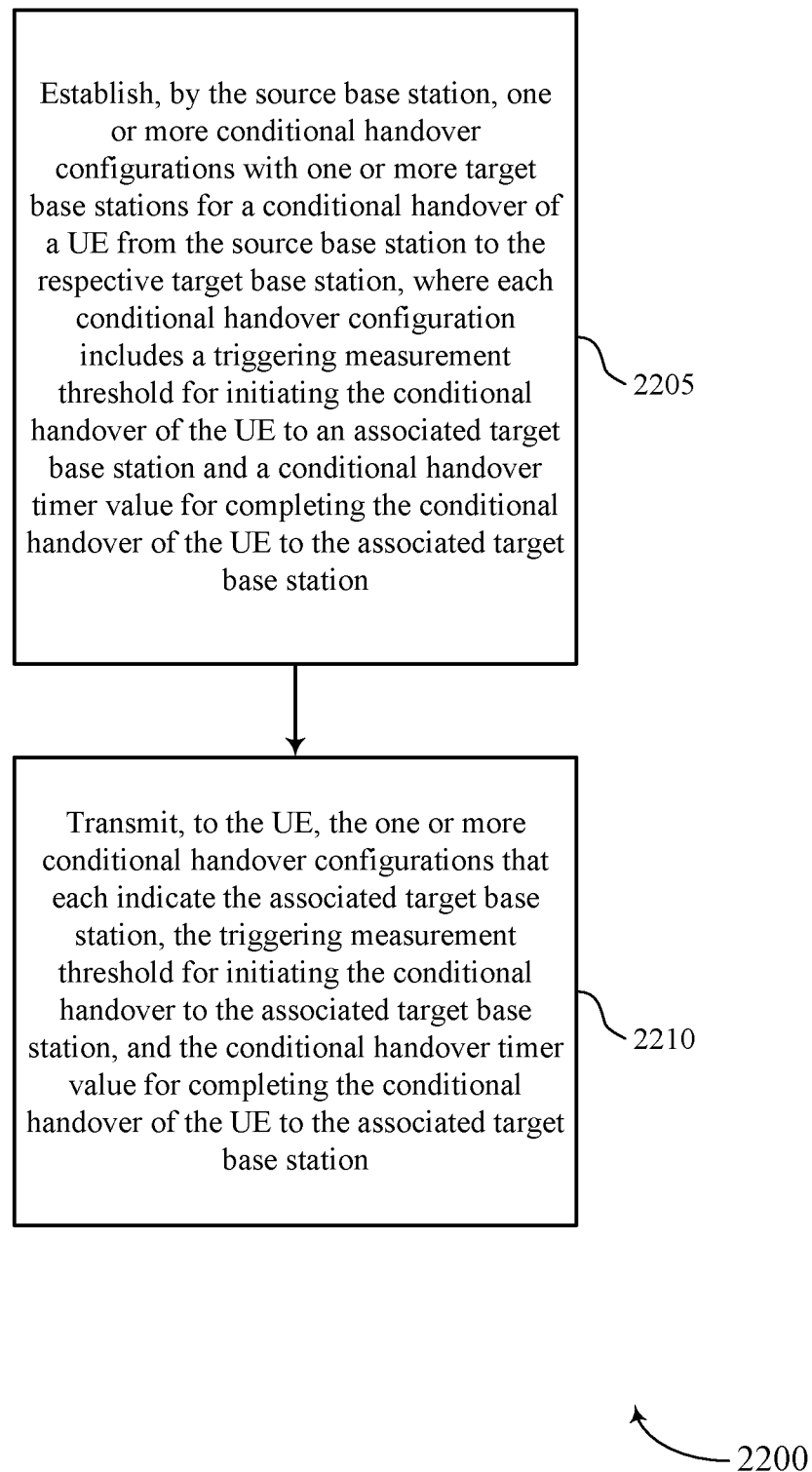

FIG. 22 shows a flowchart illustrating a method 2200 that supports CHO deconfiguration and failure handling in wireless communications in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may establish, by the source base station, one or more conditional handover configurations with one or more target base stations for a conditional handover of a UE from the source base station to the respective target base station, where each conditional handover configuration includes a triggering measurement threshold for initiating the conditional handover of the UE to an associated target base station and a conditional handover timer value for completing the conditional handover of the UE to the associated target base station. The operations of 2205 may be performed according to the methods described herein. In some examples, aspects of the operations of 2205 may be performed by a handover configuration manager as described with reference to FIGS. 12 through 15.

At 2210, the base station may transmit, to the UE, the one or more conditional handover configurations that each indicate the associated target base station, the triggering measurement threshold for initiating the conditional handover to the associated target base station, and the conditional handover timer value for completing the conditional handover of the UE to the associated target base station. The operations of 2210 may be performed according to the methods described herein. In some examples, aspects of the operations of 2210 may be performed by an UE handover manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Embodiment 1

A method of wireless communication, at a UE, comprising: receiving, from a source base station, a conditional handover configuration that indicates one or more target base stations, one or more measurement thresholds for initiating a handover from the source base station to the one or more target base stations, and one or more timers associated with the handover to the one or more target base stations; determining, based at least in part on the conditional handover configuration, that a first measurement threshold for initiating the handover to a first target base station is satisfied; transmitting, based at least in part on the conditional handover configuration, a first random access request to the first target base station to initiate a first random access procedure for the handover to the first target base station; starting a first conditional handover timer for completing the first random access procedure responsive to the transmitting the first random access request; and determining a first conditional handover failure responsive to the first conditional handover timer expiring prior to completing the first random access procedure.

Embodiment 2

The method of embodiment 1, wherein the one or more timers include at least the first conditional handover timer for completing the first random access procedure with the first target base station.

Embodiment 3

The method of any of embodiments 1 or 2, wherein the conditional handover configuration includes at least a first conditional handover configuration for the first target base station and a second conditional handover configuration for a second target base station.

Embodiment 4

The method of any of embodiments 1 to 3, further comprising: initiating, responsive to receiving the conditional handover configuration, a first validity timer and a second validity timer; and deleting the second conditional handover configuration responsive to an expiration of the second validity timer.

Embodiment 5

The method of embodiment 4, further comprising: stopping the first validity timer upon transmitting the first random access request to the first target base station.

Embodiment 6

The method of any of embodiments 1 to 5, further comprising: determining, responsive to the first conditional handover timer expiring, that a second measurement threshold for initiating a handover to a second target base station is satisfied; transmitting, based at least in part on the conditional handover configuration, a second random access request to the second target base station to initiate a second random access procedure for the handover to the second target base station; and starting a second conditional handover timer for completing the second random access procedure.

Embodiment 7

The method of embodiment 6, further comprising: initiating a connection re-establishment procedure upon determining that no other target base stations are configured for conditional handover.

Embodiment 8

The method of any of embodiments 6 to 7, wherein a first duration of the first conditional handover timer is different than a second duration of the second conditional handover timer.

Embodiment 9

The method of any of embodiments 6 to 8, further comprising: selecting, responsive to the first conditional handover timer expiring, the second target base station from a plurality of available target base stations based at least in part on a channel quality measurement associated with each of the plurality of available target base stations.

Embodiment 10

The method of any of embodiments 6 to 9, wherein the second target base station is selected based at least in part on the second target base station having a shorter remaining validity timer duration than other of the plurality of available target base stations.

Embodiment 11

The method of any of embodiments 1 to 10, further comprising: receiving, from the source base station, a deconfiguration message that deconfigures one or more conditional handover configurations; and deconfiguring the one or more conditional handover configurations based at least in part on the deconfiguration message.

Embodiment 12

The method of embodiment 11, wherein the deconfiguration message is received in radio resource control signaling from the source base station.

Embodiment 13

The method of any of embodiments 11 to 12, further comprising: deleting one or more of a radio resource control configuration or a first measurement and reporting configuration for conditional handover trigger provided in a first conditional handover configuration; and discontinuing conditional handover measurements associated with the conditional handover configuration and evaluation of whether the measurements meet conditional handover criteria.

Embodiment 14

An apparatus comprising at least one means for performing a method of any of embodiments 1 to 13.

Embodiment 15

An apparatus for wireless communications comprising a processor; memory in electronic communication with the processor; and instructions stored in the memory and executable by the processor to cause the apparatus to perform a method of any of embodiments 1 to 13.

Embodiment 16

A non-transitory computer-readable medium storing code for wireless communications, the code comprising instructions executable by a processor to perform a method of any of embodiments 1 to 13.

Embodiment 17

A method of wireless communication, at a user equipment (UE), comprising: receiving, from a source base station, a conditional handover configuration that indicates one or more conditional handover configurations associated with one or more target base stations, wherein each of the one or more conditional handover configurations include a triggering measurement threshold for initiating a conditional handover to an associated target base station and a deconfiguration measurement threshold for deconfiguring the conditional handover configuration of the associated target base station; determining, based at least in part on the conditional handover configuration, that a first deconfiguration measurement threshold for deconfiguring a first conditional handover configuration of a first target base station is satisfied; and releasing the first conditional handover configuration of the first target base station.

Embodiment 18

The method of embodiment 17, further comprising: determining, based at least in part on the conditional handover configuration, that a second triggering measurement threshold for initiating a handover to a second target base station is satisfied; and transmitting, based at least in part on a second conditional handover configuration of the second target base station, a random access request to the second target base station to initiate a random access procedure for the handover to the second target base station.

Embodiment 19

The method of any of embodiments 17 to 18, wherein the releasing the first conditional handover configuration comprises: deleting one or more of a radio resource control configuration, a first measurement and reporting configuration for conditional handover trigger and conditional handover deconfiguration trigger, or one or more timers associated with the first target base station, that are provided in the first conditional handover configuration; and discontinuing conditional handover measurements associated with the first target base station and evaluating whether the measurements meet conditional handover criteria or conditional handover deconfiguration criteria.

Embodiment 20

The method of any of embodiments 17 to 19, further comprising: transmitting a measurement report to the source base station that indicates the first conditional handover configuration of the first target base station is released.

Embodiment 21

The method of any of embodiments 17 to 20, further wherein the measurement report contains a deconfiguration indication for the first target base station.

Embodiment 22

The method of any of embodiments 17 to 21, wherein the first deconfiguration measurement threshold is a channel quality threshold associated with the first target base station, and wherein the first conditional handover configuration is released responsive to a channel quality measurement of the first target base station being below the channel quality threshold.

Embodiment 23

The method of any of embodiments 17 to 22, wherein the first deconfiguration measurement threshold comprises a first threshold value associated with the source base station and a second threshold value associated with the first target base station, and wherein the first conditional handover configuration is released responsive to a first channel quality measurement of the source base station exceeding the first threshold and a second channel quality measurement of the first target base station being below the second threshold value.

Embodiment 24

The method of any of embodiments 17 to 23, wherein the first deconfiguration measurement threshold is a difference threshold, and wherein the first conditional handover configuration is released responsive to a difference between channel quality measurements of the source base station and the first target base station exceeding the difference threshold.

Embodiment 25

An apparatus comprising at least one means for performing a method of any of embodiments 17 to 24.

Embodiment 26

An apparatus for wireless communications comprising a processor; memory in electronic communication with the processor; and instructions stored in the memory and executable by the processor to cause the apparatus to perform a method of any of embodiments 17 to 24.

Embodiment 27

A non-transitory computer-readable medium storing code for wireless communications, the code comprising instructions executable by a processor to perform a method of any of embodiments 17 to 24.

Embodiment 28

A method for wireless communication at a source base station, comprising: establishing, by the source base station, one or more conditional handover configurations with one or more target base stations for a conditional handover of a user equipment (UE) from the source base station to the respective target base station, wherein each conditional handover configuration includes a validity time period during which the conditional handover configuration is valid and a conditional handover time period for completing a random access procedure upon initiation of the conditional handover of the UE from the source base station to the respective target base station; and transmitting, to the UE, the one or more conditional handover configurations that each indicate an associated target base station, one or more measurement thresholds for initiating the handover of the UE from the source base station to the associated target base station, and the conditional handover time period of the associated target base station.

Embodiment 29

The method of embodiment 28, further comprising: deconfiguring a first conditional handover configuration of a first target base station responsive to an expiration of a first validity time period associated with the first target base station.

Embodiment 30

The method of any of embodiments 28 to 29, wherein the UE autonomously deconfigures the first conditional handover configuration of the first target base station based on the expiration of the first validity time period.

Embodiment 31

The method of any of embodiments 28 to 30, wherein each of the one or more target base stations has a different value for one or more of the validity time period or the conditional handover time period.

Embodiment 32

The method of any of embodiments 28 to 31, wherein one or more of the validity time period or the conditional handover time period is determined based at least in part on one or more of an estimate of movement of the UE relative to each respective target base station, a traffic load of the source base station or each respective target base station, channel quality measurements for each respective target base station provided by the UE, or any combinations thereof.

Embodiment 33

An apparatus comprising at least one means for performing a method of any of embodiments 28 to 32.

Embodiment 34

An apparatus for wireless communications comprising a processor; memory in electronic communication with the processor; and instructions stored in the memory and executable by the processor to cause the apparatus to perform a method of any of embodiments 28 to 32.

Embodiment 35

A non-transitory computer-readable medium storing code for wireless communications, the code comprising instructions executable by a processor to perform a method of any of embodiments 28 to 32.

Embodiment 36

A method for wireless communication at a source base station, comprising: establishing, by the source base station, one or more conditional handover configurations with one or more target base stations for a conditional handover of a user equipment (UE) from the source base station to the respective target base station, wherein each conditional handover configuration includes a triggering measurement threshold for initiating the conditional handover of the UE to an associated target base station and a conditional handover timer value for completing the conditional handover of the UE to the associated target base station; and transmitting, to the UE, the one or more conditional handover configurations that each indicate the associated target base station, the triggering measurement threshold for initiating the conditional handover to the associated target base station, and the conditional handover timer value for completing the conditional handover of the UE to the associated target base station.

Embodiment 37

The method of embodiment 36, further comprising: determining to deconfigure at least one a first conditional handover configuration at the UE; transmitting, responsive to the determining to deconfigure, deconfiguration information to the UE that indicates the UE is to delete one or more of a radio resource control configuration or a first measurement and reporting configuration for the first conditional handover configuration; receiving, from the UE, a measurement report that indicates that a first deconfiguration measurement threshold for deconfiguring a first conditional handover configuration of a first target base station is satisfied; and releasing the first conditional handover configuration of the first target base station responsive to the measurement report.

Embodiment 38

The method of any of embodiments 36 to 37, wherein the releasing the first conditional handover configuration comprises: deleting one or more of a radio resource control configuration, the first deconfiguration measurement threshold, a first triggering measurement threshold, or one or more timers associated with the first target base station, that are included in the first conditional handover configuration.

Embodiment 39

The method of any of embodiments 36 to 38, wherein the releasing the first conditional handover configuration further comprises: providing an indication to the first target base station that the first conditional handover configuration is released.

Embodiment 40

The method of any of embodiments 36 to 39, wherein the deconfiguration measurement threshold is a channel quality threshold associated with each respective target base station, and wherein the conditional handover configuration of a first target base station is released responsive to a channel quality measurement of the first target base station being below the channel quality threshold of the first target base station.

Embodiment 41

The method of any of embodiments 36 to 40, wherein the deconfiguration measurement threshold comprises a first threshold value associated with the source base station and a second threshold value for each respective target base station, and wherein the conditional handover configuration of a first target base station is released responsive to a first channel quality measurement of the source base station exceeding the first threshold and a second channel quality measurement of the first target base station being below the second threshold value of the first target base station.

Embodiment 42

The method of any of embodiments 36 to 41, wherein the deconfiguration measurement threshold is a difference threshold, and wherein the conditional handover configuration associated with a first target base station is released responsive to a difference between channel quality measurements of the source base station and the first target base station exceeding the difference threshold.

Embodiment 43

An apparatus comprising at least one means for performing a method of any of embodiments 36 to 42.

Embodiment 44

An apparatus for wireless communications comprising a processor; memory in electronic communication with the processor; and instructions stored in the memory and executable by the processor to cause the apparatus to perform a method of any of embodiments 36 to 42.

Embodiment 45

A non-transitory computer-readable medium storing code for wireless communications, the code comprising instructions executable by a processor to perform a method of any of embodiments 36 to 42.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a source base station, a conditional handover configuration that indicates one or more target base stations, one or more measurement thresholds for initiating a handover from the source base station to the one or more target base stations, and one or more timers associated with the handover to the one or more target base stations;
   determining, based at least in part on the conditional handover configuration, that a first measurement threshold for initiating the handover to a first target base station is satisfied;
   transmitting, based at least in part on the conditional handover configuration, a first random access request to the first target base station to initiate a first random access procedure for the handover to the first target base station;
   starting a first conditional handover timer for completing the first random access procedure responsive to the transmitting the first random access request; and
   determining a first conditional handover failure responsive to the first conditional handover timer expiring prior to completing the first random access procedure.

2. The method of claim 1, wherein the one or more timers include at least the first conditional handover timer for completing the first random access procedure with the first target base station.

3. The method of claim 1, wherein the conditional handover configuration includes at least a first conditional handover configuration for the first target base station and a second conditional handover configuration for a second target base station.

4. The method of claim 1, further comprising
   transmitting, responsive to the first conditional handover timer expiring, a second random access request to a second target base station to initiate a second random access procedure for the handover to the second target base station; and
   starting a second conditional handover timer for completing the second random access procedure.

5. The method of claim 4, further comprising:
   initiating a connection re-establishment procedure upon determining that no other target base stations are configured for conditional handover.

6. The method of claim 4, wherein a first duration of the first conditional handover timer is different than a second duration of the second conditional handover timer.

7. The method of claim 4, further comprising:
   selecting, responsive to the first conditional handover timer expiring, the second target base station from a plurality of available target base stations based at least in part on a channel quality measurement associated with each of the plurality of available target base stations.

8. The method of claim 1, further comprising initiating, responsive to the first conditional handover timer expiring, a connection re-establishment procedure.

9. The method of claim 1, further comprising:
receiving, from the source base station, a deconfiguration message that deconfigures one or more conditional handover configurations; and
deconfiguring the one or more conditional handover configurations based at least in part on the deconfiguration message.

10. The method of claim 9, wherein the deconfiguration message is received in radio resource control signaling from the source base station.

11. The method of claim 9, further comprising:
deleting one or more of a radio resource control configuration or a first measurement and reporting configuration for conditional handover trigger provided in a first conditional handover configuration; and
discontinuing conditional handover measurements associated with the conditional handover configuration and evaluation of whether the conditional handover measurements meet conditional handover criteria.

12. An apparatus for wireless communication at a user equipment (UE), comprising:
a processor,
memory in electronic communication with the processor; and
instructions stored in the memory and executable by the processor to cause the apparatus to:
receive, from a source base station, a conditional handover configuration that indicates one or more target base stations, one or more measurement thresholds for initiating a handover from the source base station to the one or more target base stations, and one or more timers associated with the handover to the one or more target base stations;
determine, based at least in part on the conditional handover configuration, that a first measurement threshold for initiating the handover to a first target base station is satisfied;
transmit, based at least in part on the conditional handover configuration, a first random access request to the first target base station to initiate a first random access procedure for the handover to the first target base station;
start a first conditional handover timer for completing the first random access procedure responsive to the transmitting the first random access request; and
determine a first conditional handover failure responsive to the first conditional handover timer expiring prior to completing the first random access procedure.

13. The apparatus of claim 12, wherein the one or more timers include at least the first conditional handover timer for completing the first random access procedure with the first target base station.

14. The apparatus of claim 12, wherein the instructions are further executable by the processor to cause the apparatus to:
transmit, responsive to the first conditional handover timer expiring a second random access request to a second target base station to initiate a second random access procedure for the handover to the second target base station; and
start a second conditional handover timer for completing the second random access procedure.

15. The apparatus of claim 12, wherein the instructions are further executable by the processor to cause the apparatus to:
initiate, responsive to the first conditional handover timer expiring, a connection re-establishment procedure.

16. The apparatus of claim 12, wherein the instructions are further executable by the processor to cause the apparatus to:
receive, from the source base station, a deconfiguration message that deconfigures one or more conditional handover configurations; and
deconfigure the one or more conditional handover configurations based at least in part on the deconfiguration message.

17. The apparatus of claim 16, wherein the deconfiguration message is received in radio resource control signaling from the source base station, and wherein the instructions are further executable by the processor to cause the apparatus to:
delete one or more of a radio resource control configuration or a first measurement and reporting configuration for conditional handover trigger provided in a first conditional handover configuration; and
discontinue conditional handover measurements associated with the conditional handover configuration and evaluation of whether the conditional handover measurements meet conditional handover criteria.

18. The apparatus of claim 16, wherein the deconfiguration message is received in radio resource control signaling from the source base station.

19. The apparatus of claim 12, wherein the conditional handover configuration includes at least a first conditional handover configuration for the first target base station and a second conditional handover configuration for a second target base station.

20. The apparatus of claim 14, wherein the instructions are further executable by the processor to cause the apparatus to:
initiate a connection re-establishment procedure upon determining that no other target base stations are configured for conditional handover.

21. The apparatus of claim 14, wherein a first duration of the first conditional handover timer is different than a second duration of the second conditional handover timer.

22. The apparatus of claim 14, wherein the instructions are further executable by the processor to cause the apparatus to:
select, responsive to the first conditional handover timer expiring, the second target base station from a plurality of available target base stations based at least in part on a channel quality measurement associated with each of the plurality of available target base stations.

23. An apparatus for wireless communication at a user equipment (UE), comprising:
means for receiving, from a source base station, a conditional handover configuration that indicates one or more target base stations, one or more measurement thresholds for initiating a handover from the source base station to the one or more target base stations, and one or more timers associated with the handover to the one or more target base stations;

means for determining, based at least in part on the conditional handover configuration, that a first measurement threshold for initiating the handover to a first target base station is satisfied;

means for transmitting, based at least in part on the conditional handover configuration, a first random access request to the first target base station to initiate a first random access procedure for the handover to the first target base station;

means for starting a first conditional handover timer for completing the first random access procedure responsive to the transmitting the first random access request; and means for determining a first conditional handover failure responsive to the first conditional handover timer expiring prior to completing the first random access procedure.

24. The apparatus of claim 23, wherein the one or more timers include at least the first conditional handover timer for completing the first random access procedure with the first target base station.

25. The apparatus of claim 23, further comprising:

means for transmitting, responsive to the first conditional handover timer expiring, a second random access request to a second target base station to initiate a second random access procedure for the handover to the second target base station; and means for starting a second conditional handover timer for completing the second random access procedure.

26. The apparatus of claim 23, further comprising:

means for initiating a connection re-establishment procedure upon determining that no other target base stations are configured for conditional handover.

27. The apparatus of claim 23, further comprising:

means for receiving, from the source base station, a deconfiguration message that deconfigures one or more conditional handover configurations; and means for deconfiguring the one or more conditional handover configurations based at least in part on the deconfiguration message.

28. The apparatus of claim 27, further comprising:

means for deleting one or more of a radio resource control configuration or a first measurement and reporting configuration for conditional handover trigger provided in a first conditional handover configuration; and means for discontinuing conditional handover measurements associated with the conditional handover configuration and evaluation of whether the conditional handover measurements meet conditional handover criteria.

29. A non-transitory computer-readable medium storing code for wireless communication at a user equipment (UE), the code comprising instructions executable by a processor to:

receive, from a source base station, a conditional handover configuration that indicates one or more target base stations, one or more measurement thresholds for initiating a handover from the source base station to the one or more target base stations, and one or more timers associated with the handover to the one or more target base stations;

determine, based at least in part on the conditional handover configuration, that a first measurement threshold for initiating the handover to a first target base station is satisfied;

transmit, based at least in part on the conditional handover configuration, a first random access request to the first target base station to initiate a first random access procedure for the handover to the first target base station;

start a first conditional handover timer for completing the first random access procedure responsive to the transmitting the first random access request; and determine a first conditional handover failure responsive to the first conditional handover timer expiring prior to completing the first random access procedure.

* * * * *